(12) United States Patent
Haas et al.

(10) Patent No.: US 8,766,148 B2
(45) Date of Patent: Jul. 1, 2014

(54) BAKING OVEN HAVING INDUCTORS AND SUSCEPTOR PLATES

(75) Inventors: Johann Haas, Klosterneuburg (AT); Stefan Jiraschek, Königsbrunn (AT); Johannes Haas, Vienna (AT); Josef Haas, Vienna (AT); Erich Koletnik, Klosterneuburg (AT); Fritz Obermaier, Vienna (AT); Marcus Pickart, Würmla (AT)

(73) Assignee: Franz Haas Waffel- und Keksanlagen-Industrie GmbH, Vienna (AT)

( * ) Notice: Subject to any disclaimer, the term of this patent is extended or adjusted under 35 U.S.C. 154(b) by 1444 days.

(21) Appl. No.: 12/030,002

(22) Filed: Feb. 12, 2008

(65) Prior Publication Data

US 2009/0200291 A1  Aug. 13, 2009

(51) Int. Cl.
*H05B 6/12* (2006.01)
*A23C 3/00* (2006.01)
*A21B 3/13* (2006.01)

(52) U.S. Cl.
USPC ............ 219/622; 219/600; 219/621; 219/620; 219/624; 219/725; 426/523; 426/118; 426/234; 426/243; 99/324; 99/443 R; 99/443 C; 99/386; 99/360

(58) Field of Classification Search
CPC ........... H05B 6/12; A47J 36/027; A21B 1/42; Y10S 99/14; B29C 65/3612
USPC ......... 219/620–622, 624, 630, 631, 634–637, 219/645, 647, 649, 650–653, 655–658, 219/671–676; 99/373, 443 C, 443 R, 391, 99/393, 324, 360–367, 377, 380–386, 397, 99/404, 407, 420, 421 H, 421 HH, 421 HV, 99/423, 432, 439, 428; 426/523, 118, 234, 426/243; 432/121, 152
See application file for complete search history.

(56) References Cited

U.S. PATENT DOCUMENTS 3,444,346 A * 5/1969 Cable et al. ................... 219/645
3,632,948 A * 1/1972 Moulin et al. ................. 219/615

(Continued)

FOREIGN PATENT DOCUMENTS

| EP | 1479296 A2 | 11/2004 |
| GB | 2325132 A | 11/1998 |
| WO | 9503713 A1 | 2/1995 |

OTHER PUBLICATIONS

Austrian Search Report.

*Primary Examiner* — Dana Ross
*Assistant Examiner* — Ket D Dang
(74) *Attorney, Agent, or Firm* — Laurence A. Greenberg; Werner H. Stemer; Ralph E. Locher

(57) ABSTRACT

A baking oven for producing baked molded products. The baking oven has an input station, a baking area and an output station. In addition, the oven has baking plates, which are arranged along a circulation path passing through the baking area, and a conveying device for the baking plates. The baking plates are in the form of susceptor plates, which can be heated inductively without contact. An induction heating device is provided in the baking area. This device includes at least one elongated inductor, which is arranged parallel to the circulation path of the baking plates and extends along the circulation path over a plurality of susceptor plates. The elongated inductor produces a large-area, broad magnetic field, which simultaneously inductively heats a plurality of baking plates in the form of susceptor plates without any contact.

47 Claims, 35 Drawing Sheets

(56) References Cited

U.S. PATENT DOCUMENTS

| | | | |
|---|---|---|---|
| 3,880,069 A * | 4/1975 | Moline | 99/483 |
| 4,503,759 A * | 3/1985 | Haas et al. | 99/380 |
| 4,812,052 A * | 3/1989 | Adam et al. | 374/50 |
| 4,820,892 A * | 4/1989 | Holmstrom et al. | 219/628 |
| 4,870,233 A * | 9/1989 | McDonald et al. | 219/730 |
| 4,987,828 A | 1/1991 | Nuns et al. | |
| 6,227,103 B1 * | 5/2001 | Haas et al. | 99/354 |
| 6,938,540 B2 * | 9/2005 | Morgan | 99/428 |
| 7,015,436 B2 | 3/2006 | Fila et al. | |
| 2002/0148830 A1 * | 10/2002 | Ross | 219/670 |
| 2004/0081934 A1 * | 4/2004 | Haas et al. | 432/121 |
| 2004/0084443 A1 * | 5/2004 | Ulrich et al. | 219/672 |
| 2004/0250692 A1 * | 12/2004 | Fila et al. | 99/443 C |
| 2006/0196870 A1 * | 9/2006 | Nikanorov et al. | 219/645 |

\* cited by examiner

BAKING OVEN HAVING INDUCTORS AND SUSCEPTOR PLATES

FIELD OF THE INVENTION

The invention relates to baking ovens with an input station, a baking area, an output station, baking plates, which are arranged along a circulation path passing through the baking area, and a conveying device for the baking plates.

Known baking ovens of this type are used for producing very different products. One product group includes pancakes, stuffed pancakes etc. Another product group includes soft waffles, American pancakes, Canadian pancakes etc. A further product group includes crunchy/crispy wafers, such as crunchy/crispy wafer sheets, for example, or crunchy/crispy flat wafers which contain numerous hollow-body halves. A further product group comprises packaging parts produced in accordance with wafer baking technology, such as planar sheets, cups, trays etc. A further product group comprises crunchy/crispy wafers, which are produced from flat wafers which can be plastically deformed in the warm, baked state, which are shaped into hollow bodies in the warm, baked state and then are allowed to solidify as hollow bodies. Such products are rolled wafer-type cones for ice-cream, deep-drawn wafer cups for ice-cream or crunchy/crispy wafer rolls etc.

PRIOR ART

Known baking ovens of this type are usually in the form of gas-heated baking ovens. In the baking area, gas-heated infrared radiators or gas flame burners are arranged along the circulation path of the baking plates, which infrared radiators or gas flame burners emit their hot combustion gases into the baking area while they heat the rear sides of the circulating baking plates. Long and branched pipelines, which lead to the gas burners arranged in the baking area, for the hot gas to be combusted are accommodated in the framework of these baking ovens. The baking ovens are provided with large air inlet openings, through which large quantities of air are sucked into the baking oven, which large quantities of air are required as combustion air for the gas burners and for cooling the hot combustion gases produced thereby.

So-called electrically heated baking ovens are also known in which heating coils heat the baking plates, which heating coils are installed in the baking plates and are in the form of electrical resistance heating. Each baking plate has been provided with a heating coil arranged in the baking plate and a current collector, which protrudes from the rear side of the baking plate. The heating coil is arranged in the baking plate in a cavity which is open towards the rear side of the baking plate. The heating coil is electrically conductively connected to the current collector in the interior of the baking plate. The current collector itself is fixed movably on the rear side of the baking plate and provided with spring mounting, which pushes it away from the rear side of the baking plate. The baking plates, which are provided with electrical resistance heating, are conveyed by the conveying device of the baking oven through the baking area. In said baking area, busbars are arranged along the circulation path of the baking plates. If the baking plates enter the baking area, their current collectors come into engagement with the busbars. In this case, the current collectors are each pressed against the rear side of the baking plate and their spring mounting is compressed. In the baking area, the current collectors slide along the busbars and, as a result of their contact with the busbars, draw current from the busbars and conduct the current to the heating coil of the respective baking plate. If the baking plates leave the baking area, the current collectors are drawn away from the busbars and their spring mounting is relieved of strain. The current collectors then spring back into their unloaded initial position.

DESCRIPTION OF THE INVENTION

The object of the invention is to improve baking ovens of the type mentioned at the outset.

For this purpose, the invention proposes a novel baking oven which is provided with an input station, a baking area and an output station, in addition with baking plates, which are arranged along a circulation path passing through the baking area, and with a conveying device for the baking plates. With the novel baking oven, the baking plates are in the form of susceptor plates, which can be heated inductively without any contact, and a baking zone provided with an induction heating device is provided in the baking area, in which baking zone at least one elongated inductor is provided, which is arranged parallel to the circulation path of the baking plates, extends along the circulation path over a plurality of baking plates and produces a large-area, broad magnetic field, which extends along the circulation path over a plurality of baking plates and simultaneously inductively heats a plurality of baking plates in the form of susceptor plates without any contact.

The novel baking oven has the advantage over the gas-heated baking ovens that the hot combustion gases produced by the gas burners in the baking area are no longer present, so that the baking oven construction can be correspondingly simplified. In a baking oven according to the invention, neither pipelines leading to the gas burners for the hot gas to be combusted are required nor are large air inlet openings required for the large quantities of air to be sucked into the baking oven, which large quantities of air are required as combustion air for the gas burners or for cooling the hot combustion gases produced thereby.

The novel baking oven has the advantage over the above-mentioned electrically heated baking ovens that both the baking plates and the baking oven construction can be considerably simplified because neither heating coils installed in the baking plates nor current collectors protruding from the baking plates are required in the baking plates and no busbars, which are in the form of sliding rails for the current collectors, are required in the baking area.

In the case of the novel baking oven, the process heat required for the baking process is produced by contact-free inductive heating of the baking plates, which are each in the form of susceptor plates. With the novel baking oven, the elongated inductor, which is arranged parallel to the circulation path of the baking plates, extends over a plurality of susceptor plates arranged one behind the other. This inductor produces a broad and large-area magnetic field, which extends along the circulation path over a plurality of susceptor plates and inductively heats them without any contact.

In accordance with a further feature of the invention, it can be provided that the baking plates are arranged along a circulation path, which passes through two horizontal transport paths arranged one on top of the other, and that a baking zone is provided on the two transport paths, in which baking zone at least one elongated inductor is provided which is arranged parallel to the circulation path of the baking plates and, with its magnetic field, simultaneously inductively heats a plurality of baking plates in the form of susceptor plates without any contact.

In accordance with a further feature of the invention, it can be provided that the baking plates are arranged along a circular circulation path and are fixed on a turntable, which is capable of rotating about a vertical axis of rotation and conveys the baking plates by means of its rotary movement through the baking area, and that a baking zone is provided in the baking area, in which baking zone at least one elongated inductor is provided which is arranged parallel to the circular circulation path and extends along the circular circulation path over a plurality of baking plates in the form of susceptor plates.

The elongated inductor can be arranged in the baking zone beneath the circulation path of the baking plates.

The elongated inductor can be arranged in the baking zone above the circulation path of the baking plates.

A least one elongated inductor can be arranged in the baking zone both above and below the circulation path of the baking plates.

In a further configuration of the invention, a novel baking oven is proposed in which upper and lower baking plates are provided which are arranged along two circulation paths passing through the baking area, are each in the form of susceptor plates and are accommodated in baking tongs, which are arranged along a circulation path passing through the baking area and are conveyed by the conveying device of the baking oven in the closed state through the baking area. With this baking oven, at least one baking zone is provided in the baking area, in which baking zone in each case at least one elongated inductor is arranged both above and below the circulation path of the baking tongs, which inductor, with its magnetic field, simultaneously inductively heats the susceptor plates of a plurality of baking tongs without any contact.

With this baking oven, the baked molded products are produced in the closed baking tongs between the upper and lower baking plates, which are arranged one above the other and are in the form of susceptor plates.

In the case of a baking oven which is equipped with baking tongs, the invention can provide that a plurality of baking tongs are arranged next to one another along a circular path and are fixed on a turntable which is capable of rotating about a vertical axis of rotation, and that at least one baking zone is provided in the baking area on the circular path, in which baking zone in each case at least one elongated, arcuate inductor is arranged both above and below the circular path, which inductor, with its magnetic field, simultaneously inductively heats the susceptor plates of a plurality of baking tongs without any contact.

In the case of a baking oven equipped with baking tongs, the invention can furthermore provide that the baking tongs, which contain the upper and lower baking plates in the form of susceptor plates, are arranged along a circulation path, which passes in the baking area through two horizontal transport paths arranged one above the other, and that a baking zone is provided on both transport paths, in which baking zone in each case at least one elongated inductor is arranged both above and below the transport path, which inductor, with its magnetic field, simultaneously inductively heats the susceptor plates of a plurality of baking tongs without any contact.

Furthermore, the invention can provide that in the case of the baking tongs, the upper tong part is pivotably connected to the lower tong part via a hinge, and that the susceptor plates in both tong parts are in each case arranged between two edge pieces, which laterally adjoin the susceptor plates, the edge pieces, which are arranged on the hinge side of the baking tong, of the two tong parts being connected to one another by the hinge and the edge piece arranged at the free end of the upper tong part bearing the control roller for opening and closing the baking tong.

In accordance with a further feature of the invention, in the case of the baking tongs the susceptor plates can be electrically insulated from the edge pieces of the two tong parts. This design makes it possible to restrict the inductive heating in both tong parts of the baking tongs to the baking plates in the form of susceptor plates.

In accordance with a further feature of the invention, in the case of the baking tongs a baking tong locking apparatus can be provided on that side edge of the baking tong which is remote from the hinge, the locking elements of said baking tong locking apparatus being fitted on those edge pieces of the two tong parts which are arranged on that side edge of the baking tong which is remote from the hinge, next to the susceptor plates.

In accordance with a further feature of the invention, in the case of the baking tongs, the two tong parts can be provided with flat plate frames, in which the susceptor plates are arranged with exposed rear sides.

According to the invention, the flat plate frames can have lateral frame parts arranged on both sides of the susceptor plates, which frame parts are connected to one another by a front transverse rail, which is arranged along the front edge of the susceptor plate, and by a rear transverse rail, which is arranged along the rear edge of the susceptor plate.

According to the invention, the susceptor plates can be mounted in floating fashion in the flat plate frames or arranged displaceably, to a limited extent, at right angles with respect to the plate plane. This design makes it possible for the dough which is arranged between the two susceptor plates in the closed baking tong and which expands at the beginning of the baking process to raise the susceptor plate, which is arranged in the upper tong part, despite the fact that the baking tong is closed.

According to the invention, the susceptor plates can be arranged in the transverse rails of the flat plate frames displaceably, to a limited extent, at right angles with respect to the plate plane.

In the case of the flat plate frames of the upper and lower tong parts, the two transverse rails can be electrically insulated from the two lateral frame parts. This design makes it possible to restrict the inductive heating to the baking plates, which are arranged in the flat plate frames and are in the form of susceptor plates.

In accordance with a further feature of the invention, the susceptor plates can contain inserts, which are embedded in them and are in the form of baking mold halves. In this case, the susceptor plates can be made of cast iron or steel and the inserts in the form of baking mold halves are made of aluminum.

In a further configuration of the invention, a novel baking oven is proposed in which upper and lower baking plates are provided which are arranged along two circulation paths passing through the baking area, are each in the form of susceptor plates and are arranged in two separate chain conveyors. The two circulation paths each have a baking section, which passes from the input station through the baking area to the output station and is arranged along a baking stretch, and a return section, which passes from the output station back to the input station. The susceptor plates, which are arranged in the baking sections of the two circulation paths along the baking stretch, are positioned opposite one another and form baking molds comprising in each case an upper and a lower baking plate. At least one baking zone is provided in the baking area, in which baking zone in each case at least one elongated inductor is arranged both above and below the baking molds arranged along the baking stretch, which inductor, with its magnetic field, simultaneously inductively heats the susceptor plates of a plurality of baking molds without any contact.

In the case of this baking oven, the baked molded products are produced in the baking molds arranged one behind the other along the baking stretch.

In the case of such a baking oven, the baking sections of the two circulation paths can be arranged along a baking stretch, which passes through two horizontal transport paths, which are arranged one above the other, in the baking area, on which transport paths in each case one baking zone is provided, in which in each case at least one elongated inductor is arranged both above and below the baking molds, which inductor, with its magnetic field, simultaneously inductively heats the susceptor plates of a plurality of baking molds without any contact.

In accordance with a further feature of the invention, a baking oven can be provided in which the upper and lower baking plates in the form of susceptor plates are arranged along two circulation paths, in which the baking sections are arranged along a horizontal baking stretch, and in which a baking zone, which extends along the horizontal baking stretch, is provided in the baking area, which baking zone comprises at least one elongated upper inductor, which is arranged over the baking molds, and at least one elongated lower inductor, which is arranged below the baking molds.

In the case of such a baking oven, the invention can furthermore provide that the upper baking plates are arranged along an upper circulation path and are suspended with their baking faces on an upper chain conveyor in such a way that they point downwards and in freely pendulous fashion, that the lower baking plates are arranged along a lower circulation path and are conveyed by a lower chain conveyor through the baking stretch, that the upper baking plates are set back from the upper chain conveyor at the beginning of the baking stretch on the lower baking plates and are raised from the lower baking plates at the end of the baking stretch, and that the lower chain conveyor conveys the baking molds, which each comprise a lower baking plate and an upper baking plate positioned thereon, along the baking stretch through the baking zone.

In the case of a baking oven in which the lower baking plates are arranged in a circulation path which has a baking section, which passes from the input station through the baking area to the output station and is arranged along a baking stretch, and a return section, which passes from the output station back to the input station, the invention can provide that the induction heating device on the circulation path of the lower baking plates on the return section provides at least one additional elongated inductor, which, with its magnetic field, simultaneously inductively heats the susceptor plates of a plurality of lower baking plates without any contact.

In the case of a baking oven in which the upper baking plates are arranged in a circulation path which has a baking section, which leads from the input station through the baking area to the output station and is arranged along a baking stretch, and has a return section, which leads from the output station back to the input station, the invention can provide that the induction heating device on the circulation path of the upper baking plates on the return section provides at least one additional elongated inductor, which, with its magnetic field, simultaneously inductively heats the susceptor plates of a plurality of upper baking plates without any contact.

In accordance with a further feature of the invention, in the case of a baking oven in which the upper and lower baking plates in the form of susceptor plates are arranged in two separate chain conveyors, at least the lower baking plates can be electrically insulated from the chain conveyor, which is arranged along their circulation path. According to the invention, the upper baking plates can also be electrically insulated from the chain conveyor, which is arranged along their circulation path.

The baking ovens are provided with an induction heating device. With this induction heating device, the invention can provide that an elongated inductor is arranged in each baking zone, which inductor extends along the circulation path of the baking plates over a plurality of baking plates and produces a broad magnetic field, which extends along the circulation path of the baking plates over a plurality of baking plates and simultaneously inductively heats a plurality of baking plates in the form of susceptor plates without any contact.

According to the invention, the elongated inductor can comprise two or more inductor bars, which are arranged next to one another, extend along the circulation path of the baking plates over a plurality of baking plates and run parallel to one another.

In accordance with a further feature of the invention, the elongated inductor can comprise individual inductor bars, which run parallel to one another and each form a dedicated inductor loop. With this design, each inductor bar is connected to the AC generator of the induction heating device via a dedicated electrical line.

In accordance with a further feature of the invention, the elongated inductor can comprise U-shaped inductors, which are arranged next to one another, each form a dedicated inductor loop and each have two inductor bars, which run parallel to one another. With this design, each U-shaped inductor is connected to the AC generator of the induction heating device via a dedicated electrical line.

In accordance with a further feature of the invention, the elongated inductor can comprise two inductors, which are arranged next to one another and form in each case one dedicated inductor loop, and in the case of which the inductor bars, which run parallel to one another, are connected at their ends by transverse bars and together with these form a coil, which is elongated in the longitudinal direction of the inductor. With this design, the two inductors which are arranged next to one another are each connected to the AC generator of the induction heating device via a dedicated electrical line.

In accordance with a further feature of the invention, the elongated inductor can be in the form of an individual inductor loop, its inductor bars, which run parallel to one another, being connected at their ends by transverse bars and together with these forming a coil, which is elongated in the longitudinal direction of the inductor. With this design, the elongated inductor is connected to the AC generator of the induction heating device via only one electrical line.

In accordance with a further feature of the invention, the elongated inductor can be in the form of an individual inductor loop, which contains two half-loops which are arranged next to one another, in the case of which the inductor bars, which run parallel to one another, are connected at their ends by transverse bars and together with these in each case form a coil, which is elongated in the longitudinal direction of the inductor. With this design, the elongated inductor is connected to the AC generator of the induction heating device via only one electrical line.

In accordance with a further feature of the invention, the inductor bars with the transverse bars connecting them can form a coil running in the clockwise direction in the case of one half-loop and form a coil running in the counterclockwise direction in the case of the other half-loop.

In accordance with a further feature of the invention, the inductor bars with the transverse bars connecting them can form coils which run in the same direction in the case of both half-loops.

In accordance with a further feature of the invention, the elongated inductor can be in the form of an individual inductor loop, its inductor bars, which run parallel to one another, being connected to one another alternately at their ends by transverse bars and together with the transverse bars forming a meandering pattern, in which the meandering loops follow on from one another transversely with respect to the longitudinal direction of the inductor.

In accordance with a further feature of the invention, solid bars, which are each provided with a low, rectangular full cross section and which face the baking plates in the form of susceptor plates with their broad sides, are provided as the inductor bars, which extend along the circulation path of the baking plates over a plurality of baking plates.

With the induction heating device according to the invention, inductor bars are provided which extend along the circulation path of the baking plates over a plurality of baking plates. The inductor bars are in the form of straight bars or in the form of bars which are curved in the form of arcs, corresponding to the profile of the circulation path of the baking plates.

A further feature of the invention provides that each inductor is fixed on the framework of the baking oven in such a way that it is electrically insulated.

A further feature of the invention provides that each inductor with its inductor bars is fixed on the framework of the baking oven in such a way that it is electrically insulated.

A further feature of the invention provides that each inductor, which extends along the circulation path of the baking plates over a plurality of baking plates, is arranged horizontally in the baking oven and is fixed on the framework of the baking oven in such a way that it is vertically adjustable.

A further feature of the invention provides that each inductor in the baking oven is arranged at a vertical distance to the circulation path of the baking plates in the form of susceptor plates which is smaller than the vertical range of the magnetic field produced by the inductor.

A further feature of the invention provides that each inductor is arranged at a distance parallel to the circulation path of the baking plates in the form of susceptor plates which is smaller than the range of the magnetic field produced by the inductor.

The invention will be explained in more detail below using a few exemplary embodiments with reference to the drawings.

DESCRIPTION OF EXEMPLARY EMBODIMENTS

Figure 1:
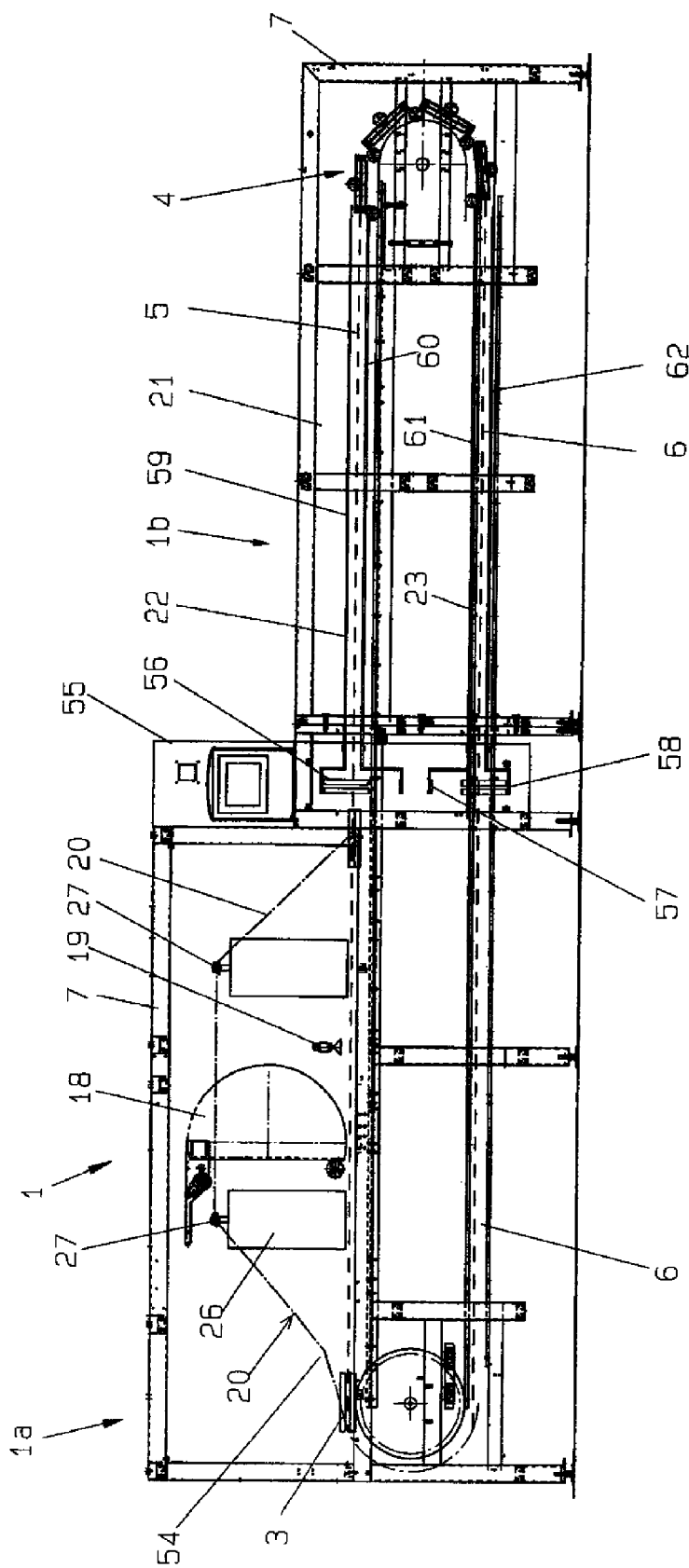
FIG. 1 shows a baking oven equipped with baking tongs, from the side.
Figure 2:
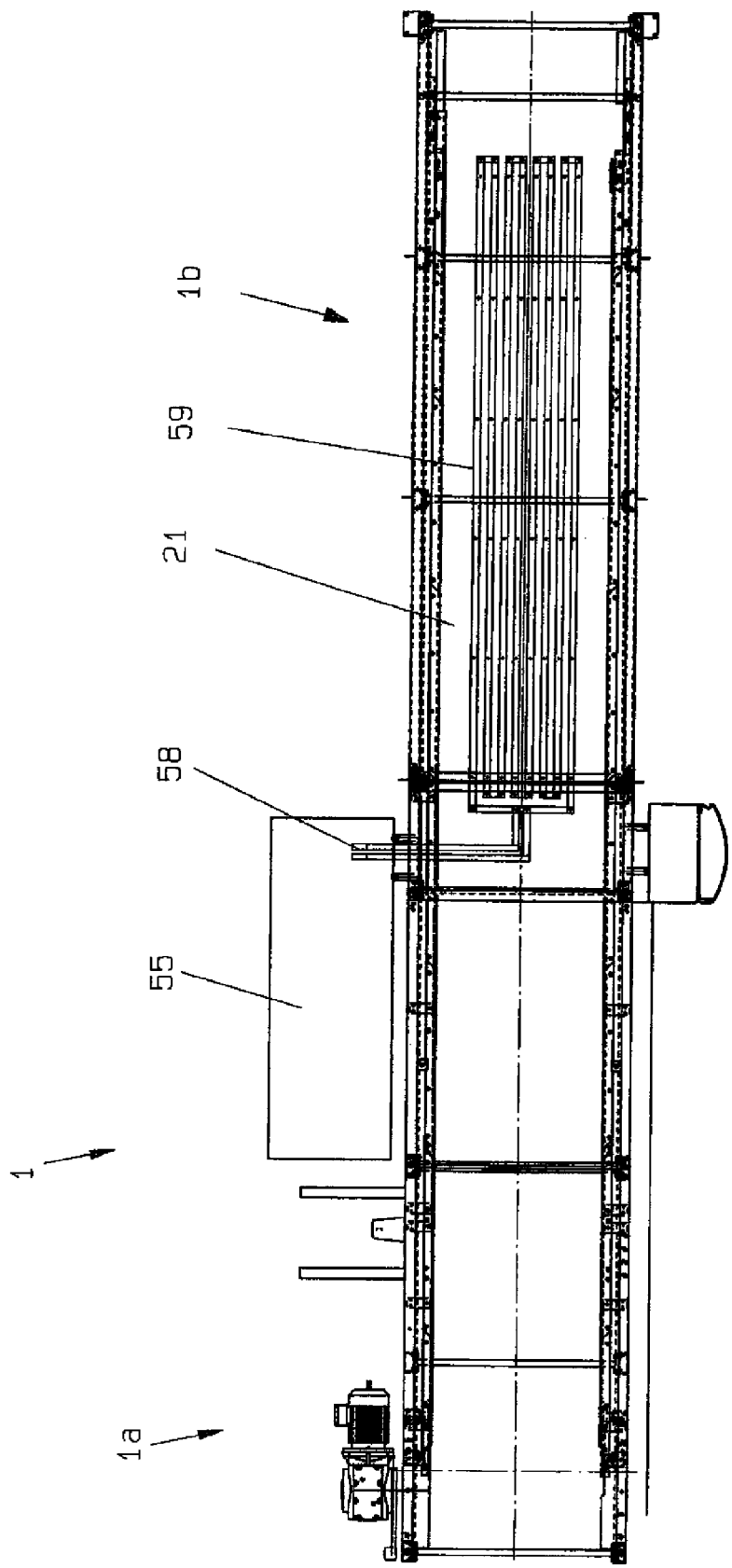
FIG. 2 shows a plan view of the baking oven from FIG. 1.
Figure 3:
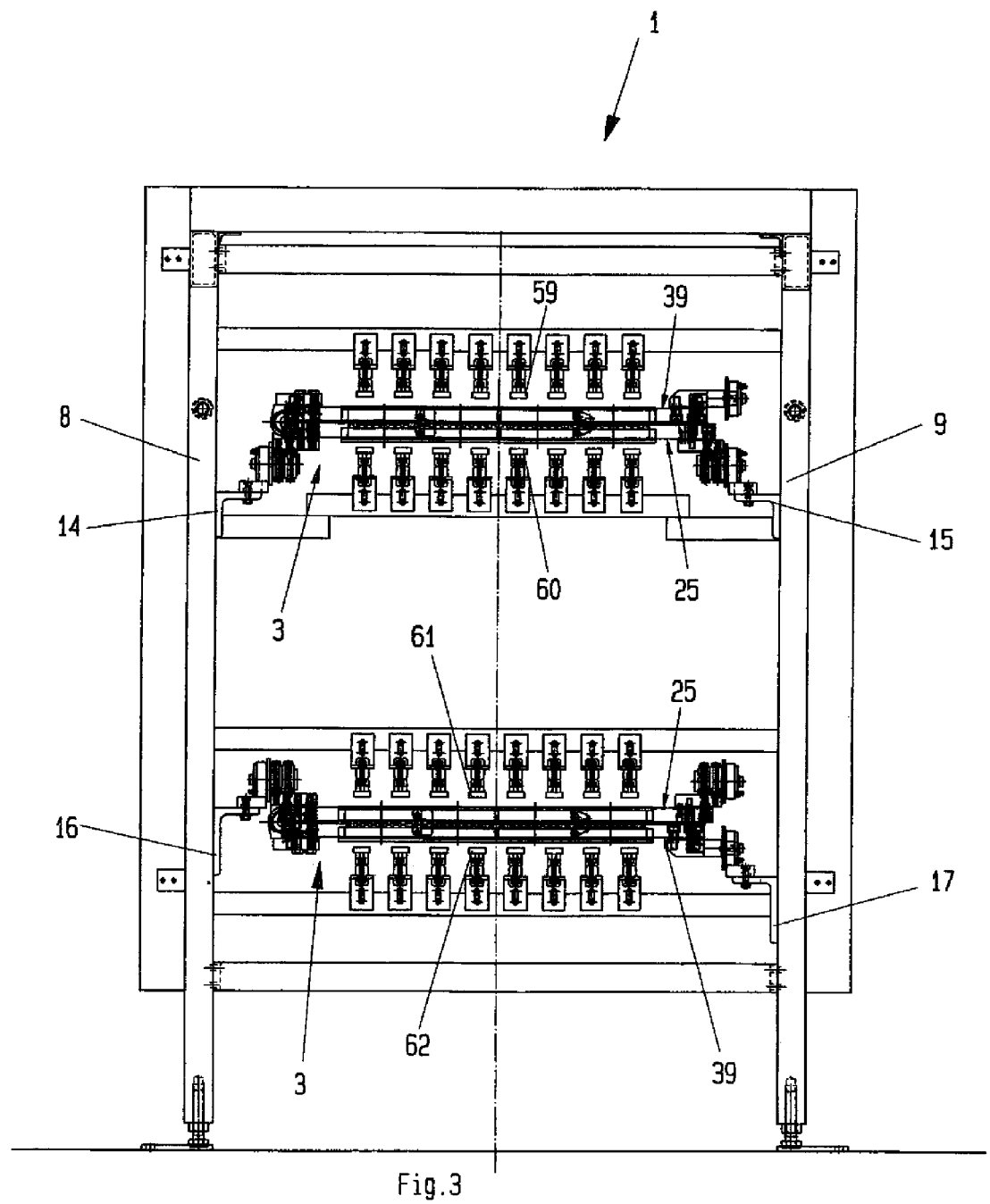
FIG. 3 shows a cross section of the baking area of the baking oven from FIG. 1.
Figure 4:
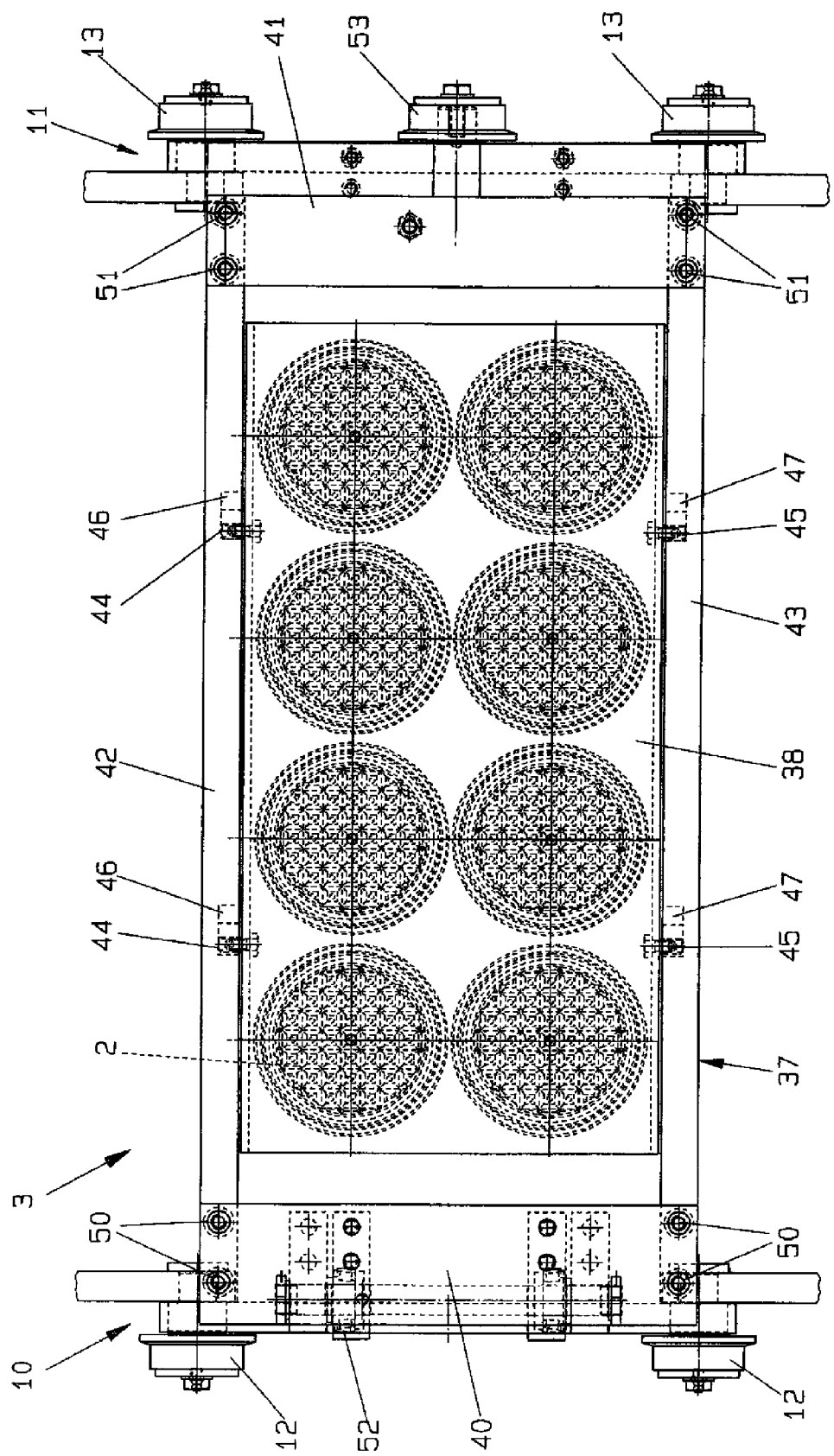
FIG. 4 shows a baking tong of the baking oven from FIG. 1 in plan view.
Figure 5:
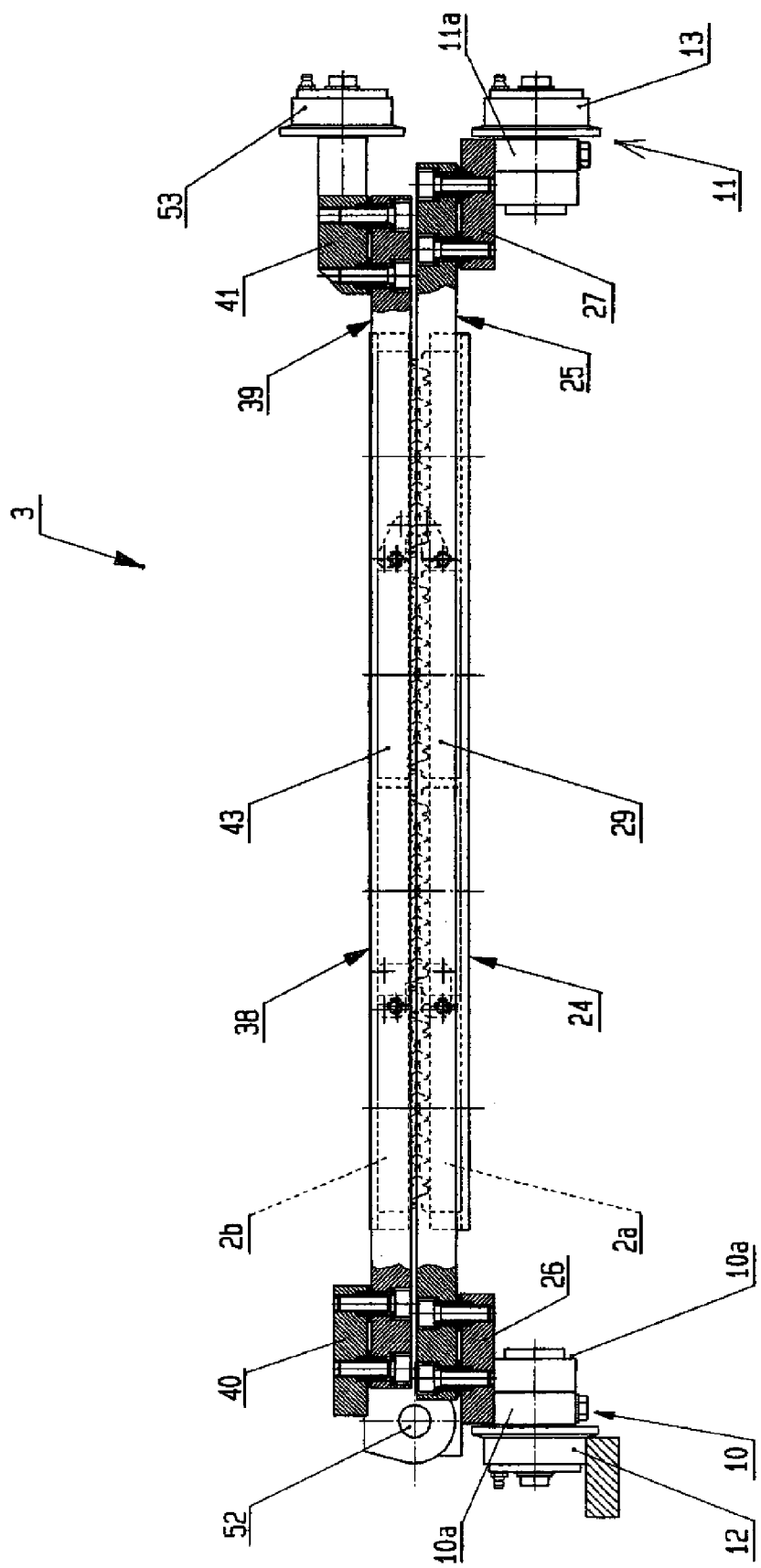
FIG. 5 shows the baking tong from FIG. 4 from the rear.
Figure 6:
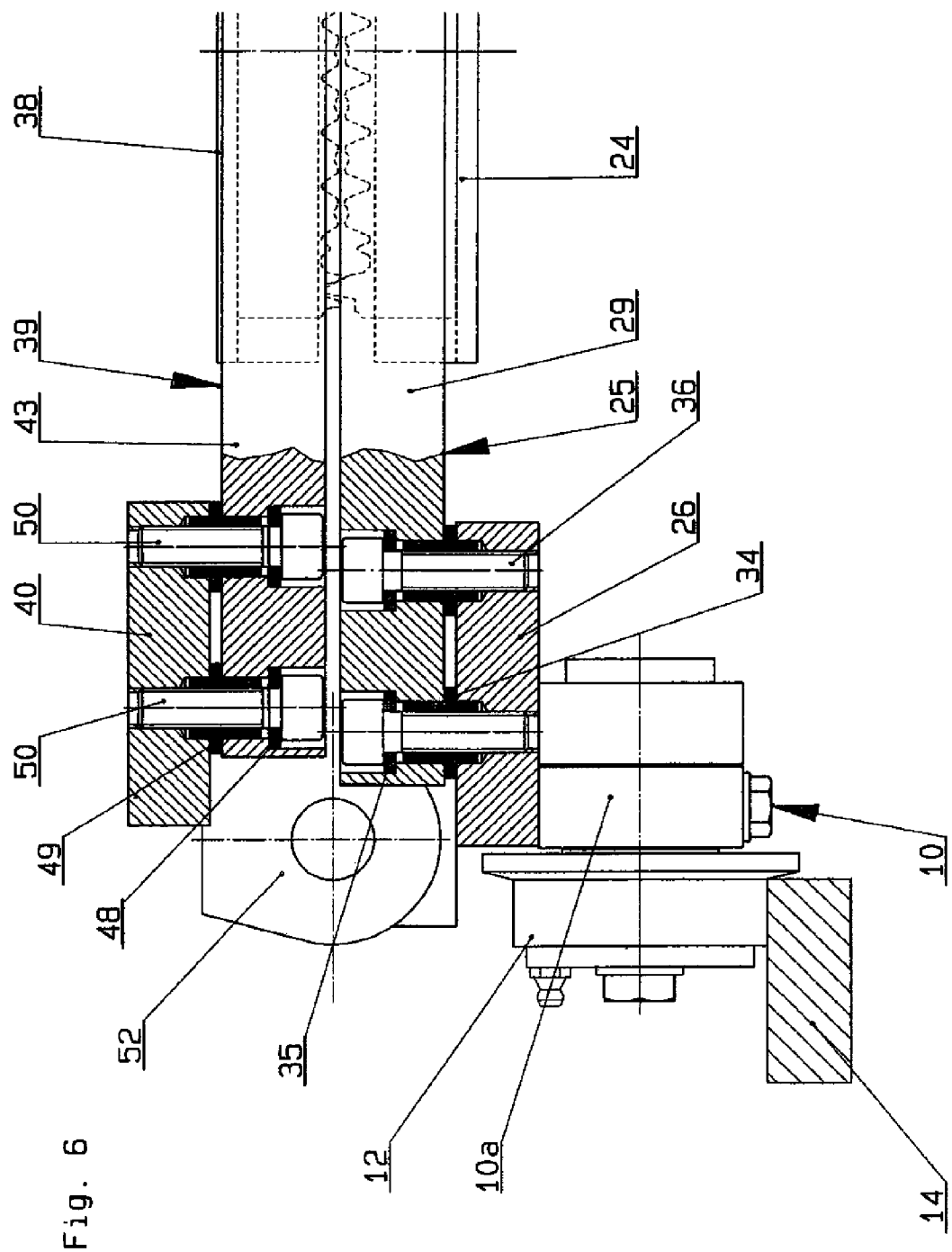
FIG. 6 shows the left-hand side edge of the baking tong from FIG. 4.
Figure 7:
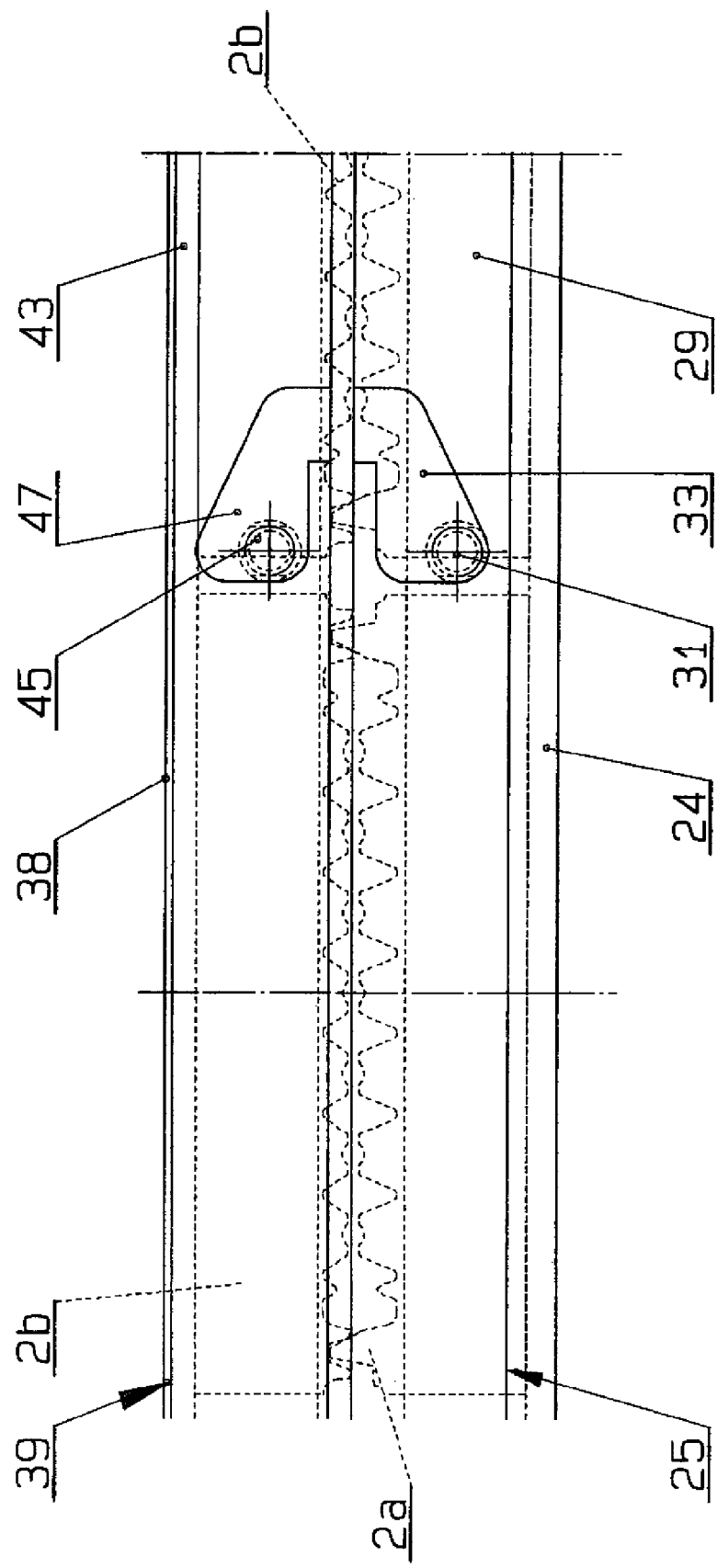
FIG. 7 shows the central part of the baking tong from FIG. 4.
Figure 8:
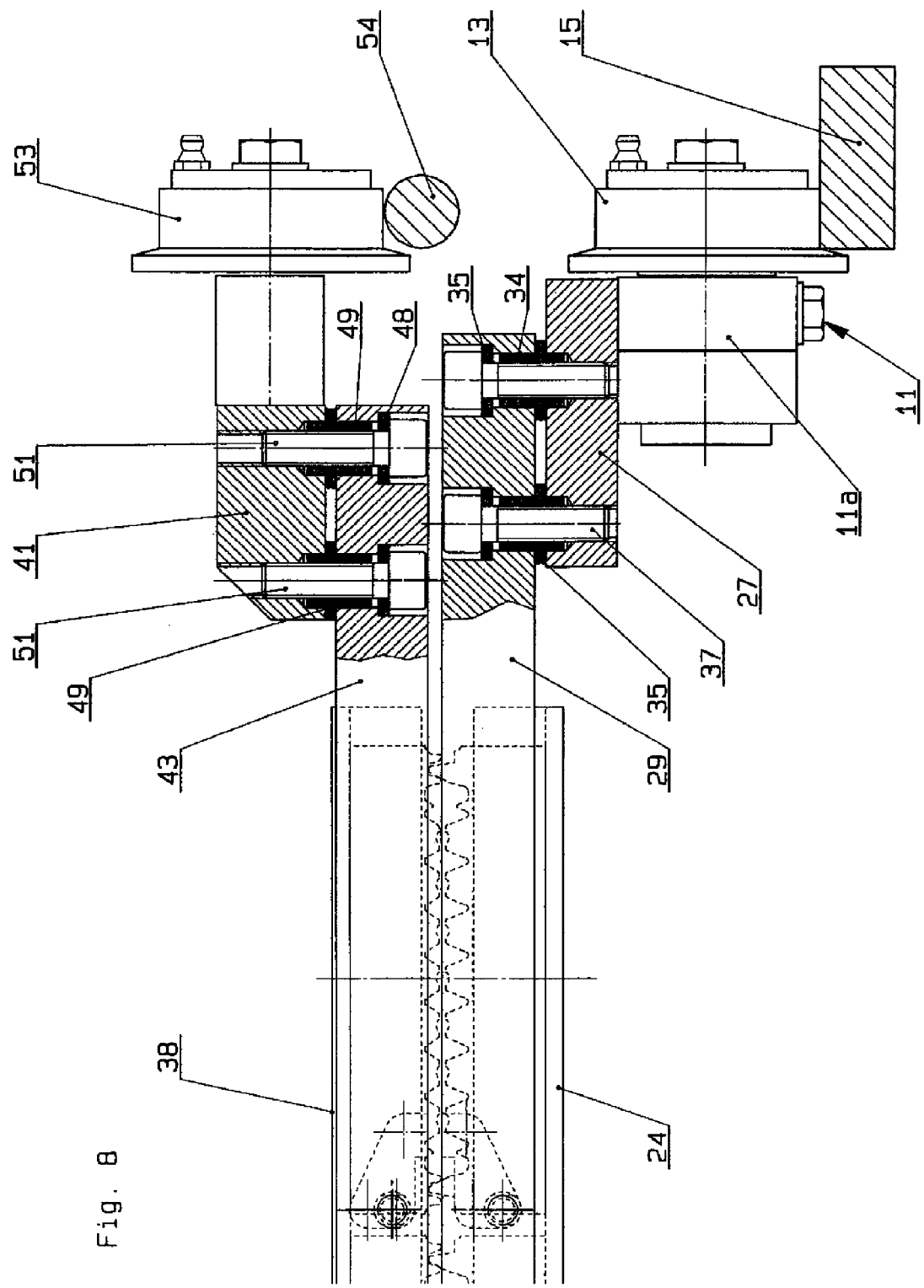
FIG. 8 shows the right-hand side edge of the baking tong from FIG. 4.
Figure 9:
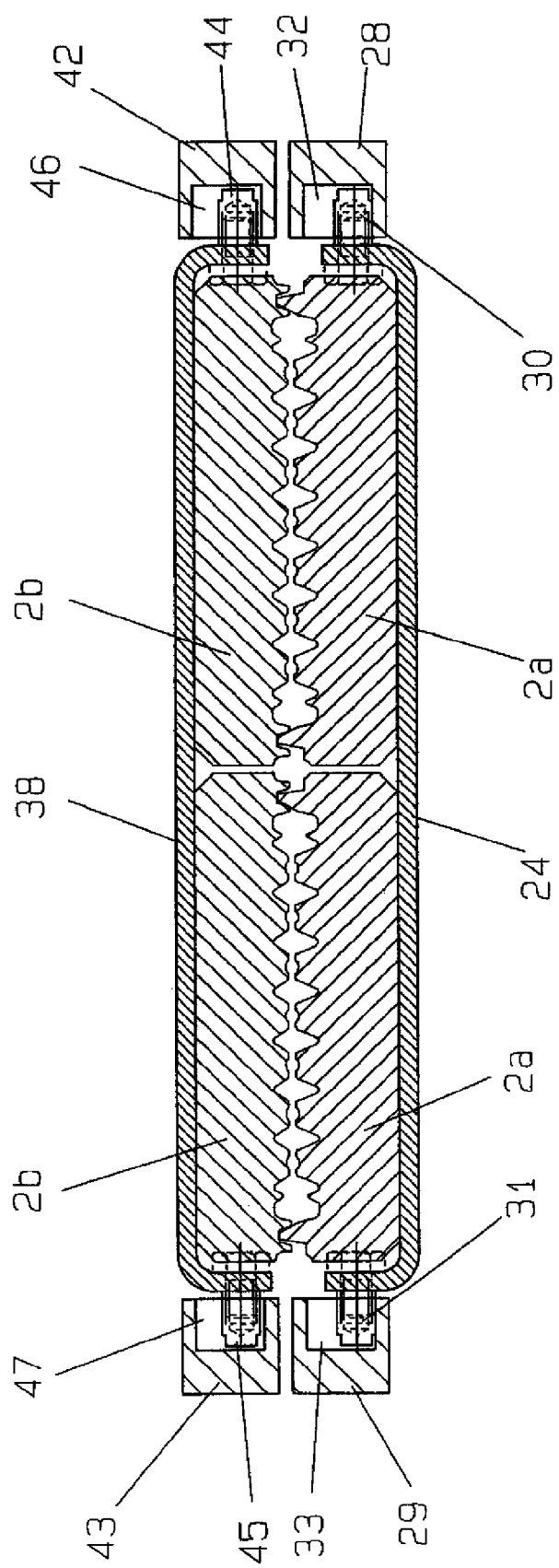
FIG. 9 shows the baking tong from FIG. 4 in a longitudinal section.

FIGS. 1 to 12 show a baking oven 1 for producing baked molded products, which are in the form of round, soft waffles. The soft waffles are produced from a liquid waffle dough in baking molds 2, which each comprise a lower baking mold 2a and an upper baking mold 2b.

The baking molds 2 are accommodated in the baking tongs 3 of a continuous baking tong chain 4. The baking tong chain 4 is arranged along a circulation path, which extends in two horizontal transport paths 5, 6 which are arranged one above the other, through the baking oven 1. The baking tong chain 4 is integrated in a chain conveyor, which is arranged along the circulation path, conveys the baking tongs 3 through the two transport paths 5, 6 and deflects them, by means of its chain wheels which are arranged at the front and rear end of the baking oven 1, from one transport path into the other.

The chain conveyor is arranged in the elongated framework 7 of the baking oven 1 between the two side walls 8, 9 of the oven framework 7. The baking tongs 3 are arranged in the chain conveyor between two lateral transport chains 10, 11 and fixed on the chain link plates 10*a*, 11*a* thereof. Hinged bolts protrude outwards from the transport chains 10, 11, on which hinged bolts running wheels 12, 13 are mounted rotatably, with which the chain conveyor is supported in both transport paths 5, 6 in each case on running rails 14, 15, 16, 17, which run in the longitudinal direction of the oven and are fixed on the two side walls 8, 9 of the oven framework 7.

On the upper transport path 5, an output station 18, an input station 19 and a device 20 for opening and closing the baking tongs 3 are arranged in the front oven half 1*a*. In the output station 18, the soft waffles are removed from the open baking tongs 3. In the input station 19, liquid waffle dough is introduced into the open baking tongs 3. Downstream of the input station 19, the baking tongs 3 are closed by the device 20. The closed baking tongs 3 are conveyed by the chain conveyor in the upper transport path 5 rearwards towards the rear end of the baking oven 1 and in the lower transport path 6 forwards towards the front end of the baking oven 1.

The baking area 21 of the baking oven 1 is accommodated in the rear oven half 1*b*. In the baking area 21, an upper baking zone 22 is arranged on the upper transport path 5 and a lower baking zone 23 is arranged on the lower transport path 6.

FIGS. 4-9 show a baking tong 3 of the baking oven 1.

Each baking tong 3 contains, in its lower tong part, a lower baking plate, which can be heated inductively without any contact. Said baking plate is in the form of a susceptor plate 24 and contains a plurality of lower baking molds 2*a*. The susceptor plate 24 is accommodated in the lower tong part in a flat, lower plate frame 25. The lower plate frame 25 has two lateral frame parts 26, 27, between which the susceptor plate 24 is arranged. The two lateral frame parts 26, 27 are connected to one another by a front transverse rail 28, which is arranged along the front edge of the susceptor plate 24, and by a rear transverse rail 29, which is arranged along the rear edge of the susceptor plate 24. The susceptor plate 24 is mounted in the transverse rails 28, 29 of the lower plate frame 25 in floating fashion or in such a way that it is capable of moving to a limited extent at right angles with respect to the plate plane. The bearing arrangement comprises bolts 30, 31, which protrude horizontally on the front and, respectively, rear edge of the susceptor plate 24 and are accommodated in the case of the transverse rails 28, 29 in depressions 32, 33 arranged on the insides thereof. The edges of these depressions 32, 33 are in the form of guide links for the bolts 30, 31. Electrically insulating interlayers 34, 35 are arranged at the lateral ends of the transverse rails 28, 29 between them and the lateral frame parts 26, 27, which interlayers 34, 35 prevent a metallic contact between the transverse rails 28, 29 and the lateral frame parts 26, 27. The transverse rails 28, 29 are rigidly connected at their ends via fixing screws 36, 37 to the lateral frame parts 26, 27. In the case of each fixing screw 36, 37, an insert washer 34 is arranged on the underside of the screw head, and a cylindrical sleeve 35 is arranged around the screw shaft, from which cylindrical sleeve 35 an annular flange protrudes outwards, which flange is arranged between the underside of the transverse rail 28, 29 and the upper side of the lateral frame part 26, 27. The insert washers 34 and the sleeves 35 are produced from an electrically insulating material.

In its upper tong part each baking tong 3 contains an upper baking plate, which can be inductively heated without any contact. Said baking plate is in the form of a susceptor plate 38 and contains a plurality of upper baking molds 2*b*. The susceptor plate 38 is accommodated in the upper tong part in a flat, upper plate frame 39. The upper plate frame 39 has two lateral frame parts 40, 41, between which the susceptor plate 38 is arranged. The two lateral frame parts 40, 41 are connected to one another by a front transverse rail 42, which is arranged along the front edge of the susceptor plate 38, and by a rear transverse rail 43, which is arranged along the rear edge of the susceptor plate 38. The susceptor plate 38 is mounted in the transverse rails 42, 43 of the upper plate frame 39 in floating fashion or in such a way that it is capable of moving to a limited extent at right angles with respect to the plate plane. The bearing arrangement comprises bolts 44, 45, which protrude horizontally at the front and, respectively, rear edge of the susceptor plate 38 and are accommodated in depressions 46, 47, which are arranged on the insides of the transverse rails 42, 43. The edges of these depressions 46, 47 are in the form of guide links for the bolts 44, 45. Electrically insulating interlayers 48, 49 are arranged at the lateral ends of the transverse rails 42, 43 between them and the lateral frame parts 40, 41, which interlayers 48, 49 prevent a metallic contact between the transverse rails 42, 43 and the lateral frame parts 40, 41. The transverse rails 42, 43 are rigidly connected at their ends via fixing screws 50, 51 to the lateral frame parts 40, 41. In the case of each fixing screw 50, 51, an insert washer 48 is arranged on the underside of the screw head and a cylindrical sleeve 49 is arranged around the screw shaft, from which cylindrical sleeve 49 an annular flange protrudes outwards, which flange is arranged between the underside of the transverse rail 42, 43 and the upper side of the lateral frame part 40, 41. The insert washers 48 and sleeves 49 are produced from an electrically insulating material.

In the case of each baking tong 3, the lower plate frame 25 is fixed with its two lateral frame parts 26, 27 on chain link plates 10*a*, 11*a* of the lateral transport chains 10, 11 of the chain conveyor. The tong parts are connected to one another pivotably via a hinge 52. The hinge 52 connects the left-hand, lateral frame part 26 of the lower plate frame 25 to the left-hand, lateral frame part 40 of the upper plate frame 39. The upper plate frame 39 bears, on its right-hand, lateral frame part 41, a control roller 53, with the aid of which the baking tong 3 is closed and opened by means of the upper tong part being pivoted. When the baking tong 3 is closed, the two susceptor plates 24, 38 arranged in the upper and lower tong part are positioned one above the other, horizontally aligned.

The baking tongs 3 are opened and closed in the front section of the upper transport path 5 when passing the device 20. The device 20 provides a guide rod 54 for the control rollers 53 of the baking tongs 3. The guide rod 54 is arranged along the upper transport path 5. The baking tongs 3 are opened and closed by the control rollers 53, which run along the guide rod 54. The guide rod 54 provides a rising section for opening the baking tongs 3, a horizontally running, upper section for keeping the baking tongs 3 open and a falling section for closing the baking tongs 3.

The baking oven 1 is provided with an induction heating device, in which an AC generator 55, which is arranged next to the front oven half 1*a*, is connected to elongated, upper and lower inductors 59, 60, 61, 62 via electrical lines 56, 57, 58 and supplies said inductors with current.

In the upper baking zone 22, an elongated, upper inductor 59 is arranged above the baking tongs 3 and an elongated, lower inductor 60 is arranged below the baking tongs 3. The magnetic field produced by the upper inductor 59 reaches down as far as the baking plates, which are arranged on the upper sides of the baking tongs 3 and are in the form of susceptor plates 38. These susceptor plates 38 are inductively heated by the magnetic field produced by the upper inductor 59, without any contact. The magnetic field produced by the lower inductor 60 reaches upwards as far as the baking plates which are arranged on the undersides of the baking tongs 3 and are in the form of susceptor plates 24. These susceptor plates 24 are inductively heated by the magnetic field produced by the lower inductor 60 without any contact.

In the lower baking zone 23, an elongated, upper inductor 61 is arranged over the baking tongs 3, and an elongated, lower inductor 62 is arranged below the baking tongs 3. The magnetic field produced by the upper inductor 61 reaches down as far as the baking plates which are arranged on the upper sides of the baking tongs 3 and are in the form of susceptor plates 24. These susceptor plates 24 are inductively heated by the magnetic field produced by the upper inductor 61 without any contact. The magnetic field produced by the lower inductor 62 reaches upwards as far as the baking plates which are arranged on the undersides of the baking tongs 3 and are in the form of susceptor plates 38. These susceptor plates 38 are inductively heated by the magnetic field produced by the lower inductor 62 without any contact.

The inductors 59, 60, 61, 62 extend in the respective baking zone 22, 23 along the circulation path of the baking tongs 3 over a plurality of baking tongs 3 arranged one behind the other. The inductors 59, 60, 61, 62 each produce a broad magnetic field, which extends along the circulation path of the baking tongs 3 over a plurality of baking tongs 3 arranged one behind the other and, in the case of the baking tongs 3 arranged one behind the other, inductively heats the baking plates in the form of susceptor plates 24, 38 without any contact. The inductors 59, 60, 61, 62 can have different designs. Some of these designs are illustrated in FIGS. 13-17.

Figure 13:
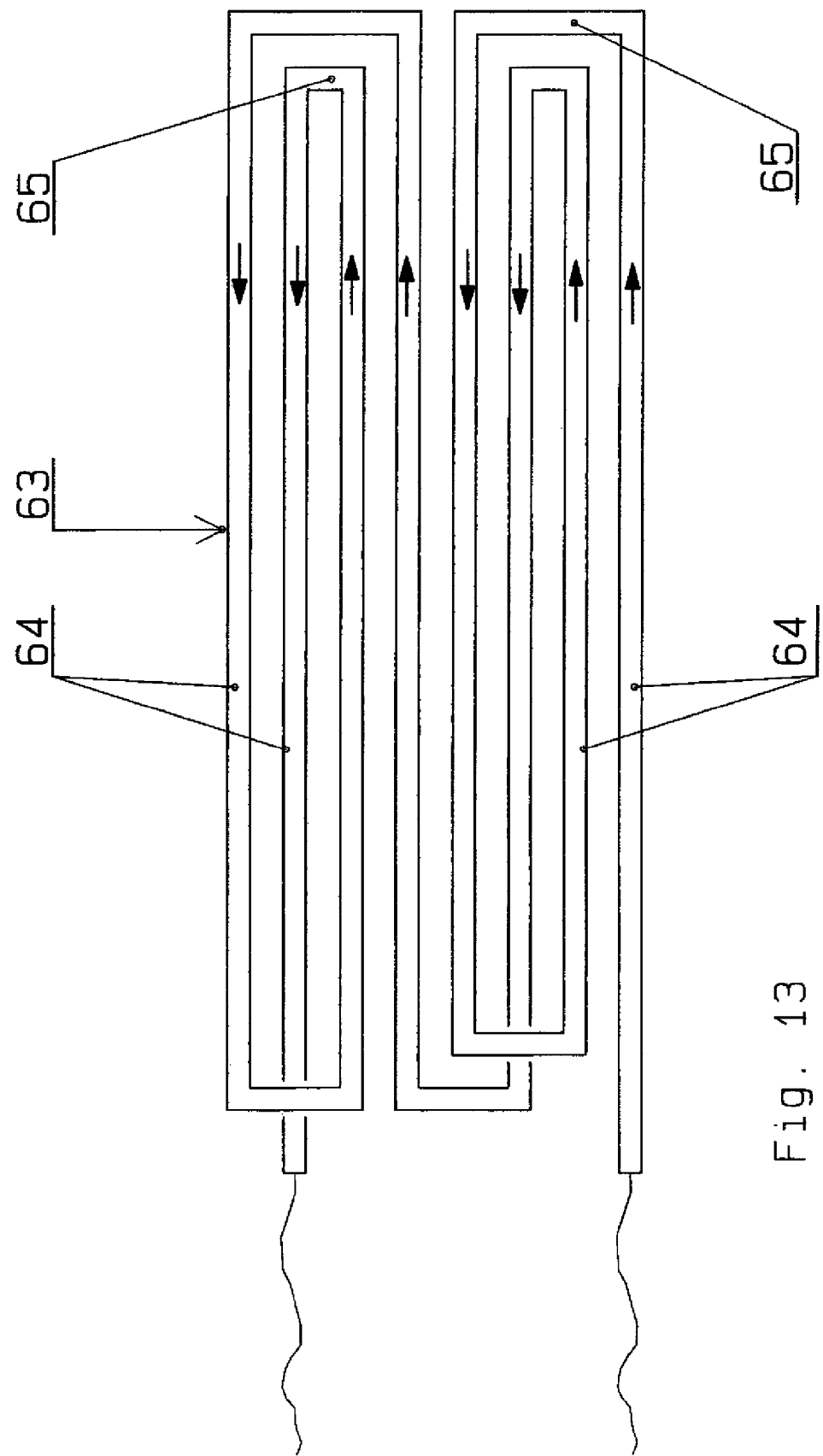
FIGS. 13 to 17 show different designs of inductors in plan view.

FIG. 13 shows a design of an elongated inductor 63. Said inductor has elongated inductor bars 64, which are arranged parallel to one another and are connected at their ends by transverse bars 65. The inductor bars 64 form, together with the transverse bars 65, an individual inductor loop. The inductor loop is connected at its two ends via electrical lines to the AC generator of the induction heating device. The inductor loop contains two half-loops, which are arranged next to one another. In the case of each half-loop, the inductor bars 64, which run parallel to one another, are connected at their ends by transverse bars 65. In the case of each half-loop, the inductor bars 64 form, together with the transverse bars 65 connecting them, a coil, which is elongated in the longitudinal direction of the inductor 63. In the case of the two half-loops, the inductor bars 64, together with the transverse bars 65, form a coil, which runs in the counterclockwise direction.

Figure 14:
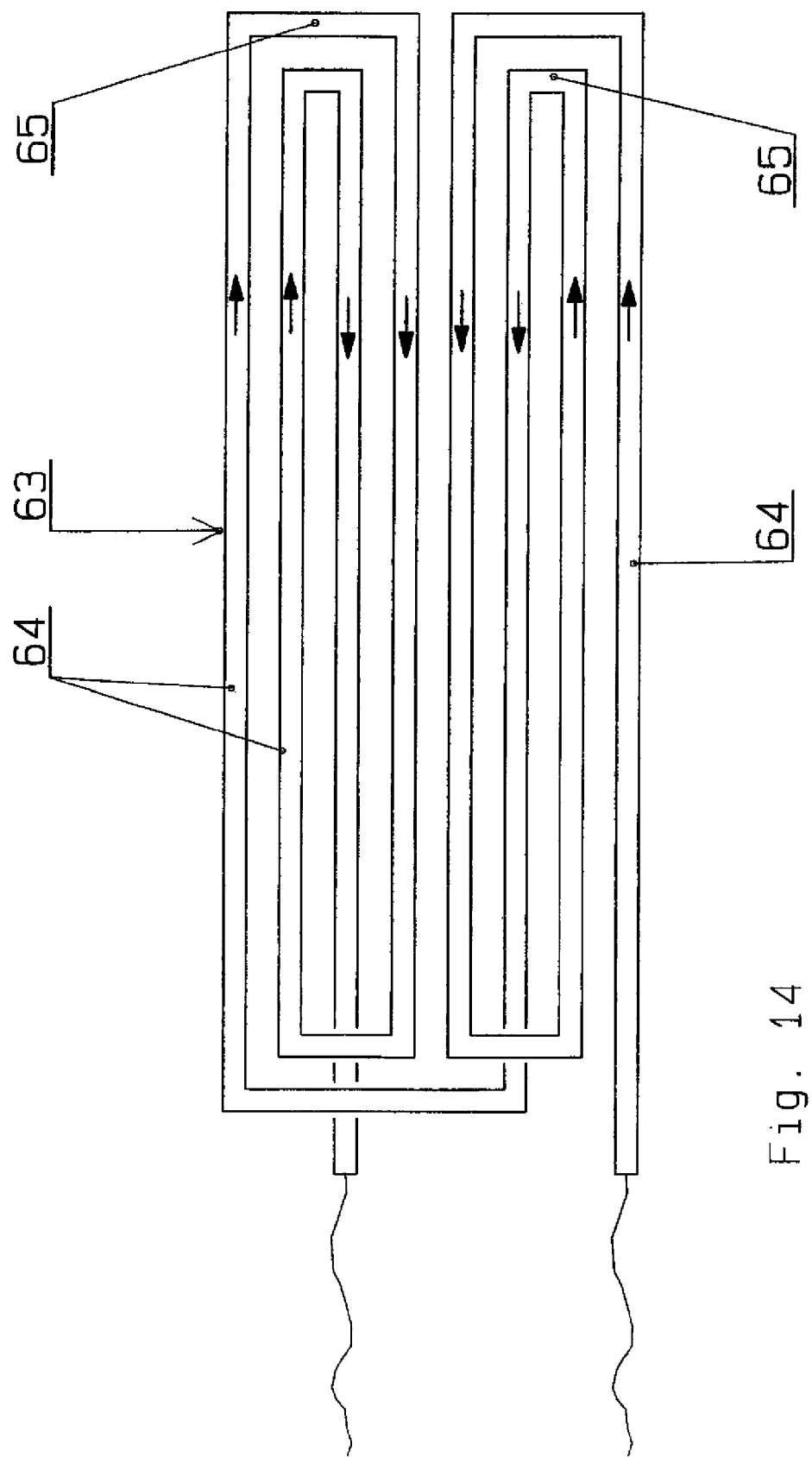

FIG. 14 shows a design of an elongated inductor 63, in which likewise elongated inductor bars 64 are provided which are arranged parallel to one another and are connected at their ends by transverse bars 65. The inductor bars 64 form, together with the transverse bars 65, an inductor loop having two half-loops. In the case of the lower half-loop in FIG. 14, the inductor bars 64, together with the transverse bars 65 connecting them, form a coil, which is elongated in the longitudinal direction of the inductor 63 and runs in the counter-clockwise direction. In the case of the upper half-loop in FIG. 14, the inductor bars 64 form, together with the transverse bars 65 connecting them, a coil, which is elongated in the longitudinal direction of the inductor 63 and runs in the clockwise direction.

Figure 15:
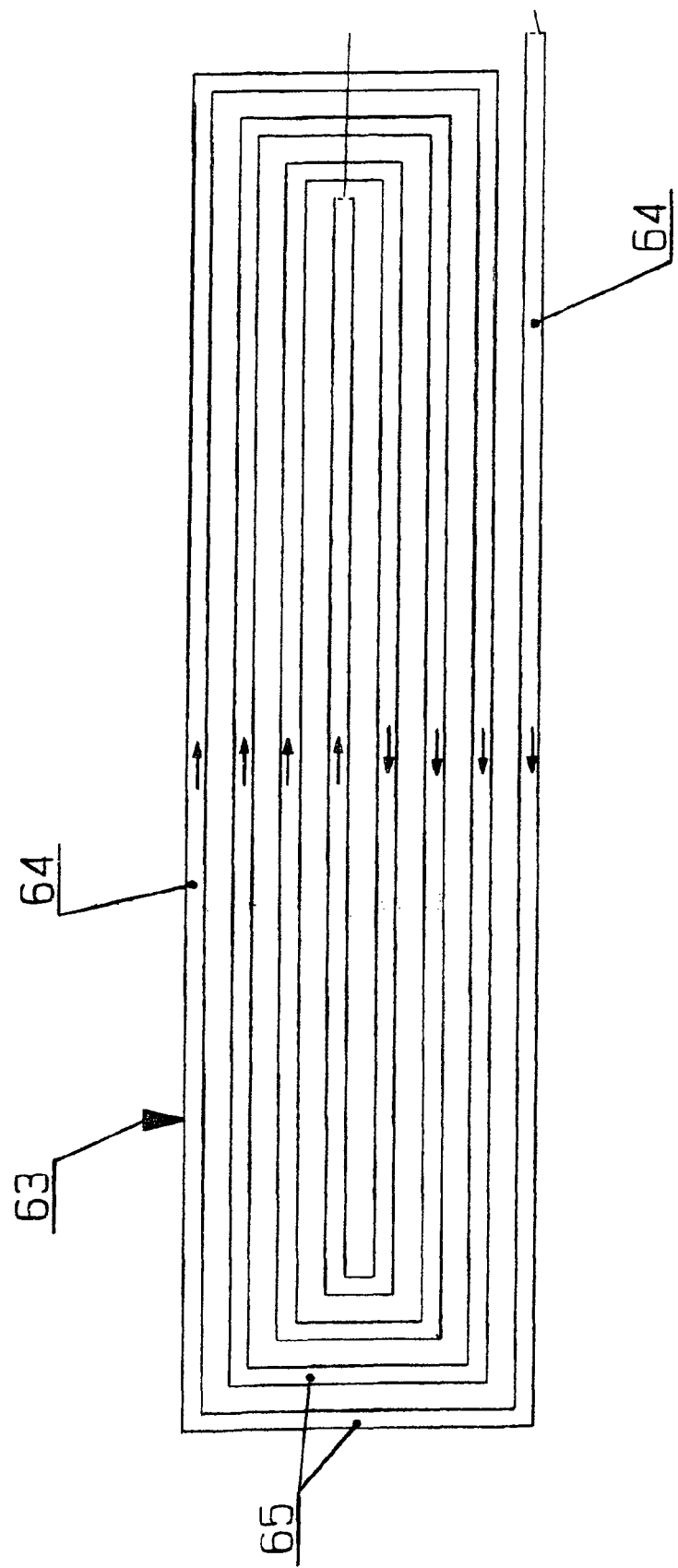

FIG. 15 shows a further design of an elongated inductor 63, in which elongated inductor bars 64, which are arranged parallel to one another, are connected at their ends by transverse bars 65 and, together with the transverse bars 65, form an individual inductor loop. In the case of the inductor in FIG. 15, all of the inductor bars 64 arranged next to one another, together with the transverse bars 65 connecting them, form a single coil, which is elongated in the longitudinal direction of the inductor 63 and runs in the clockwise direction.

Figure 16:
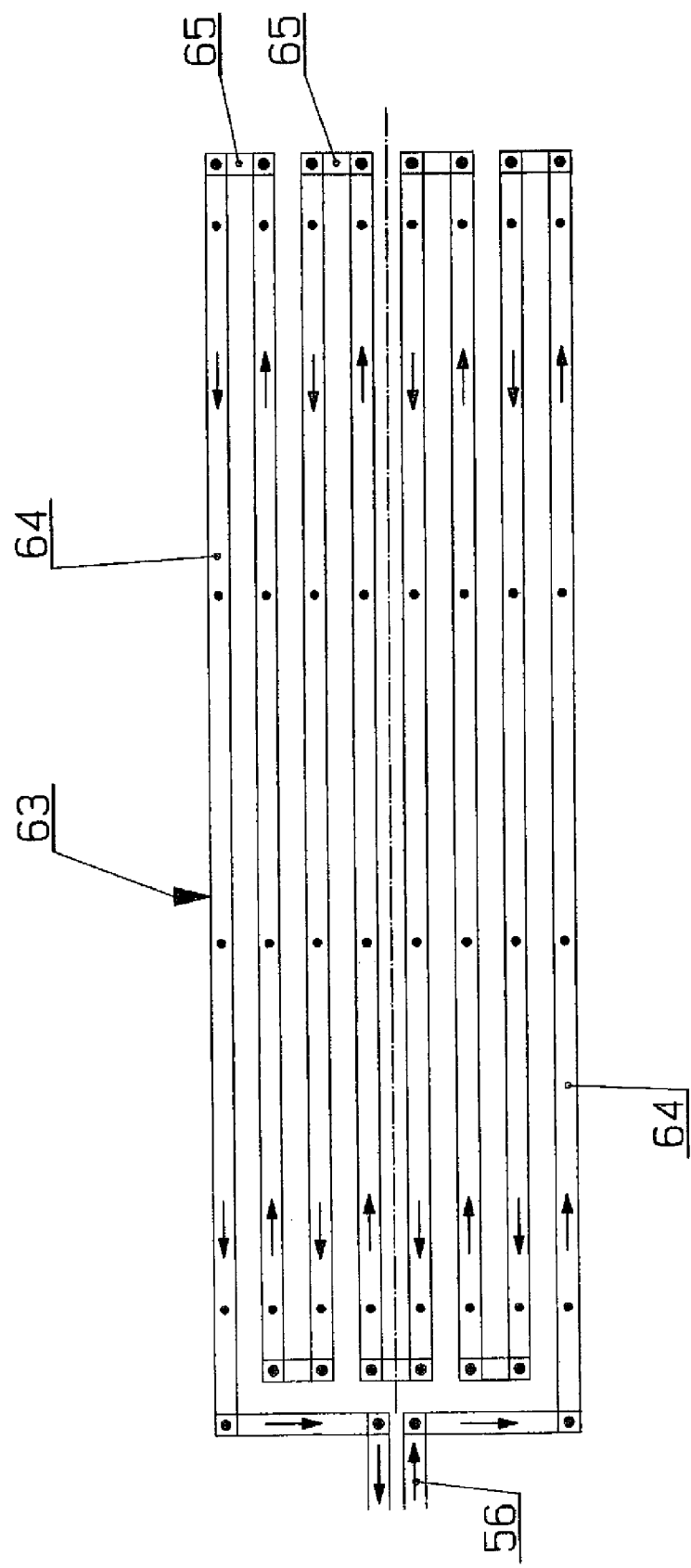

FIG. 16 shows a further design of an elongated inductor 63. In the case of this inductor 63, the inductor bars 64, which run parallel to one another, are connected to one another at their ends alternately by transverse bars 65. The inductor bars 64 form, together with the transverse bars 65, a meandering pattern, in which the meandering loops follow on from one another transversely with respect to the longitudinal direction of the inductor, from the bottom up in FIG. 16.

Figure 17:
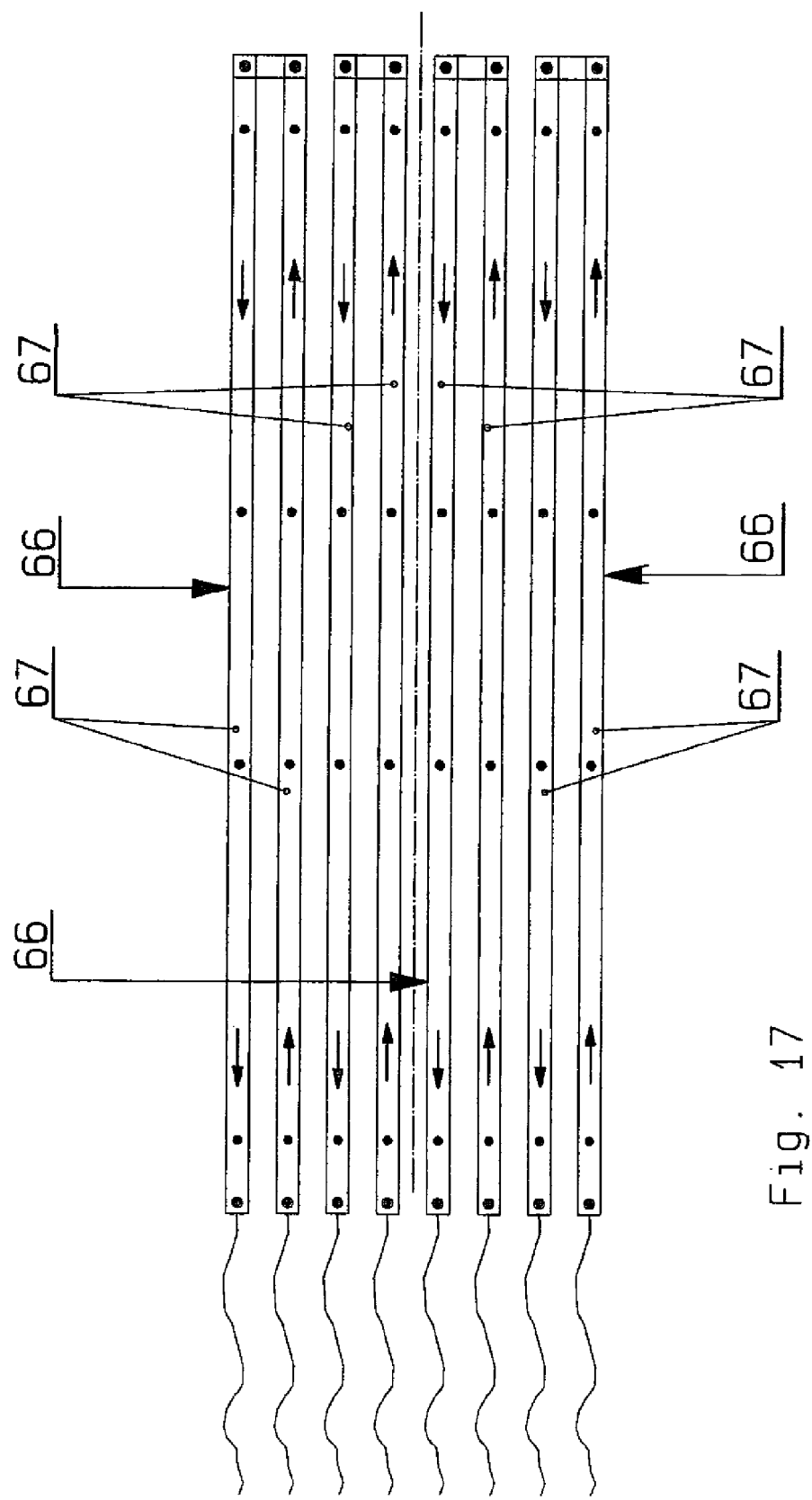
Figure 18:
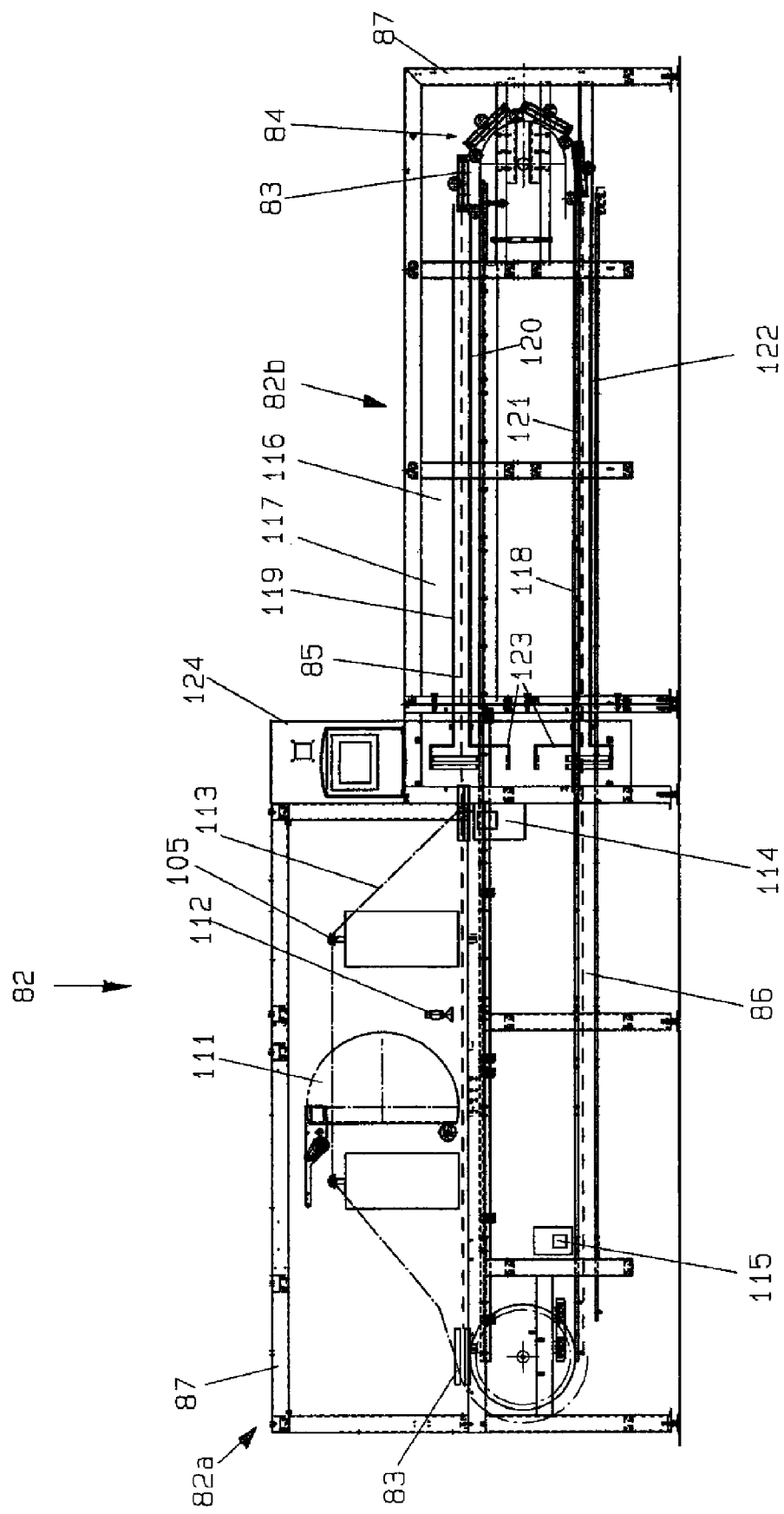
FIG. 18 shows a further baking oven equipped with baking tongs, from the side.
Figure 19:
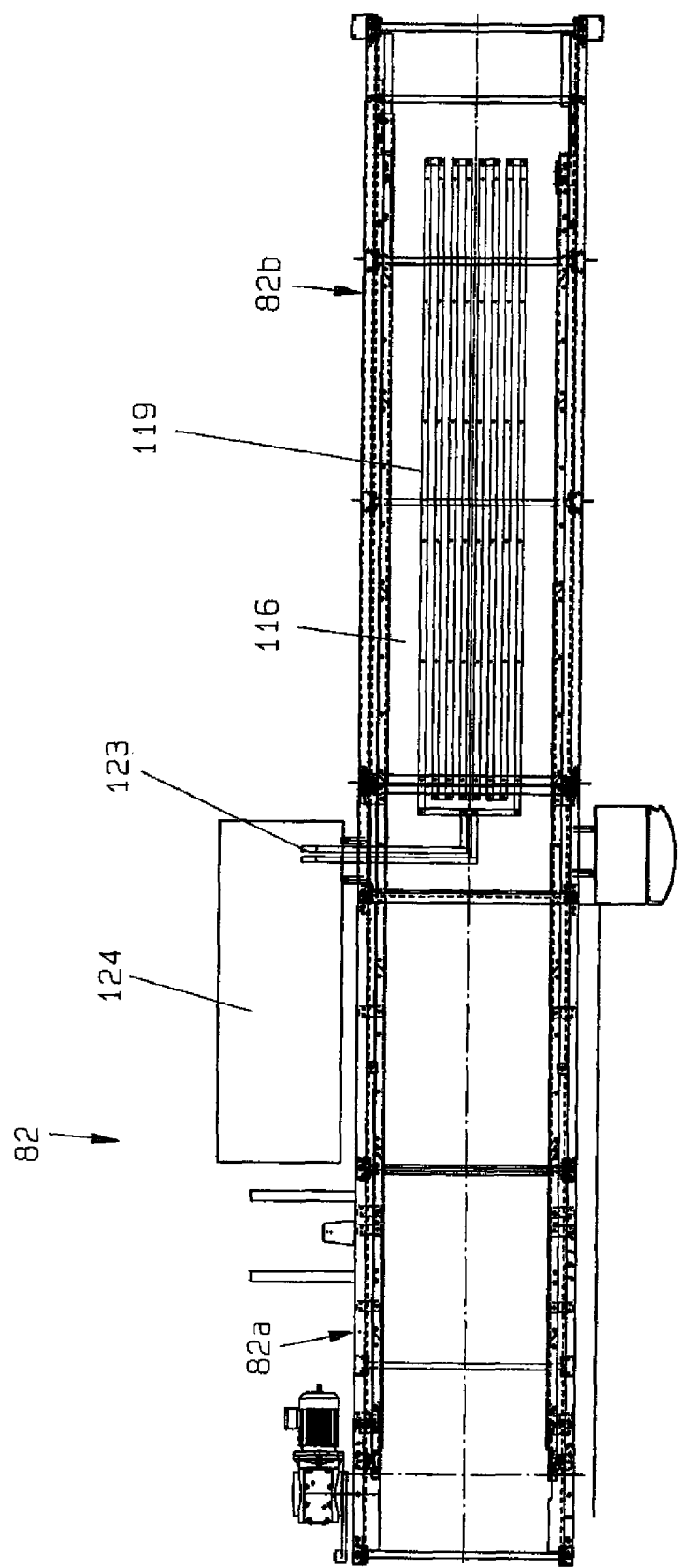
FIG. 19 shows a plan view of the baking oven from FIG. 18.
Figure 20:
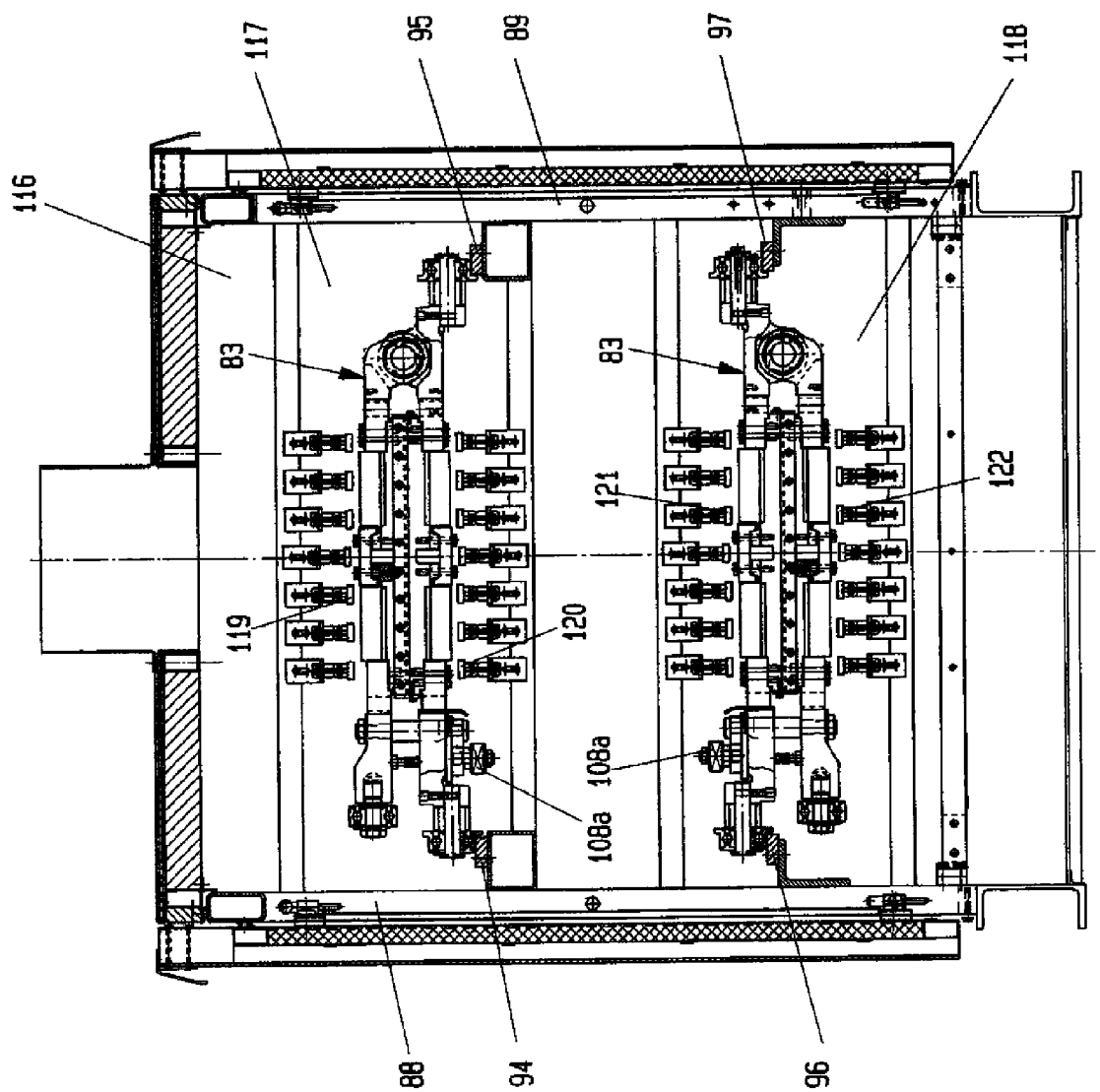
FIG. 20 shows a cross section of the baking area of the baking oven from FIG. 18.

FIG. 17 shows a further design of an elongated inductor 63. In the case of this inductor 63, a plurality of U-shaped inductors 66 are provided which are arranged next to one another and each form a dedicated inductor loop. Each U-shaped inductor 66 has two inductor bars 67, which are arranged parallel to one another and are connected at one end via two electrical lines to the AC generator of the induction heating device and are connected to one another at the other end by a transverse bar.

An elongated inductor can also comprise a plurality of inductor bars, which are arranged parallel to one another, which each form a dedicated inductor loop and which are connected at both ends via an electrical line to the AC generator of the induction heating device.

In order to fix the inductors on the oven framework, supports are provided in the two baking zones 22, 23, which supports are arranged at relatively large distances one behind the other and run in the transverse direction of the oven and on which the inductors are fixed, in each case in an electrically insulating manner, with their inductor bars running in the oven longitudinal direction. Upper transverse supports 68, which are each arranged above the upper and lower transport paths 5, 6 are provided for the upper inductors 59, 61, and lower transverse supports 69, which are each arranged below the upper and lower transport paths 5, 6, are provided for the lower inductors 60, 62. Solid bars, which are provided with a small, rectangular full cross section, are provided as the inductor bars. These bars are aligned horizontally and are arranged, with their broad sides facing the respective transport paths 5, 6, above or below the closed baking tongs 3, which are arranged in the transport path 5, 6.

Figure 10:
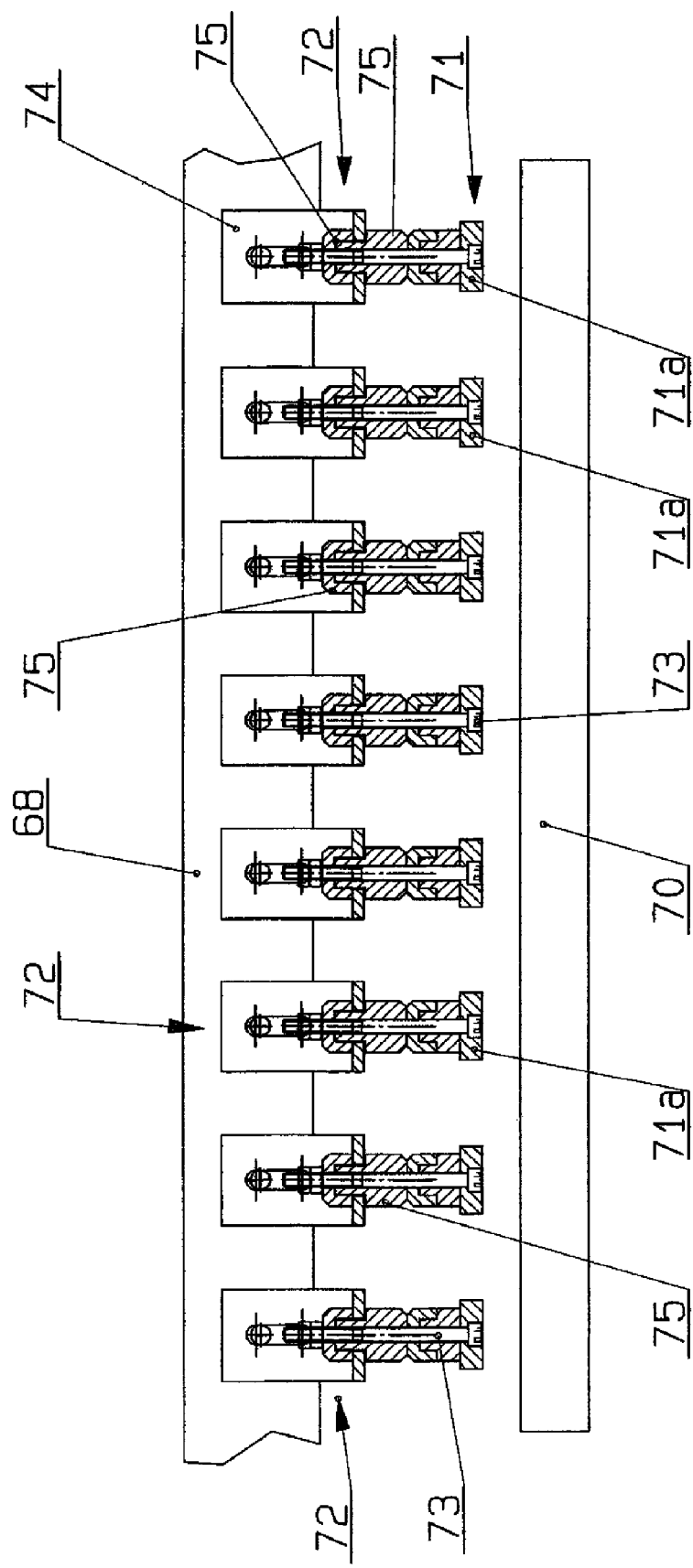
FIG. 10 shows an upper inductor, which is fixed on the oven framework.
Figure 11:
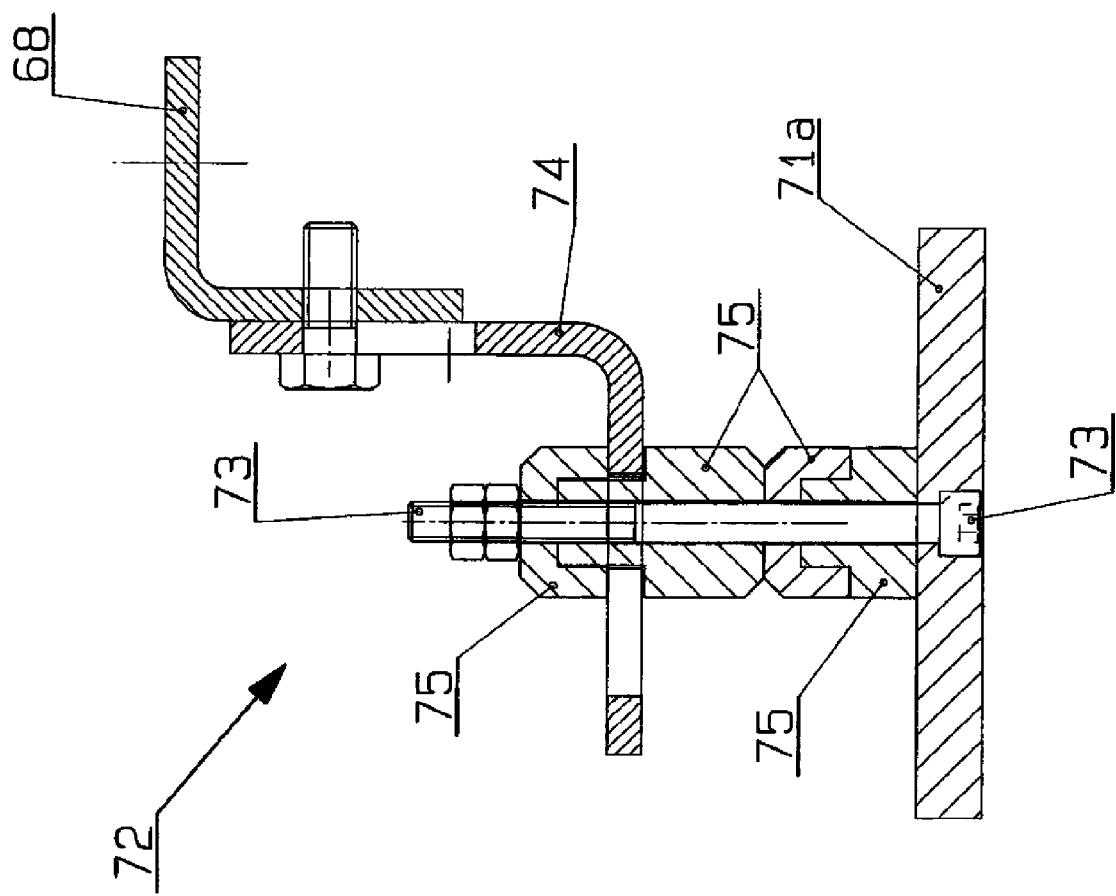
FIG. 11 shows a fixing apparatus for an inductor bar.

FIG. 10 shows an upper inductor 71, which is arranged above the rear side of a susceptor plate 70. Said inductor 71 has eight inductor bars 71a, which are arranged next to one another and are fixed, in each case in such a way that they are vertically adjustable, on an upper transverse support 68 of the oven framework 7 via electrically insulating fixing apparatuses 72. The flat inductor bars 71a, which are arranged below the transverse support 68, are arranged at the lower ends of the fixing apparatuses 72 and are fixed to the horizontally arranged, lower limbs of L-shaped fixing clips 74 via vertical fixing screws 73, which fixing clips 74 are fixed with their vertically arranged, upper limbs on the support 68 in each case in such a way that they are vertically adjustable. In each case a plurality of electrically insulating intermediate pieces 75 are arranged between the fixing screws 73 and the lower limbs of the fixing clips 74.

Figure 12:
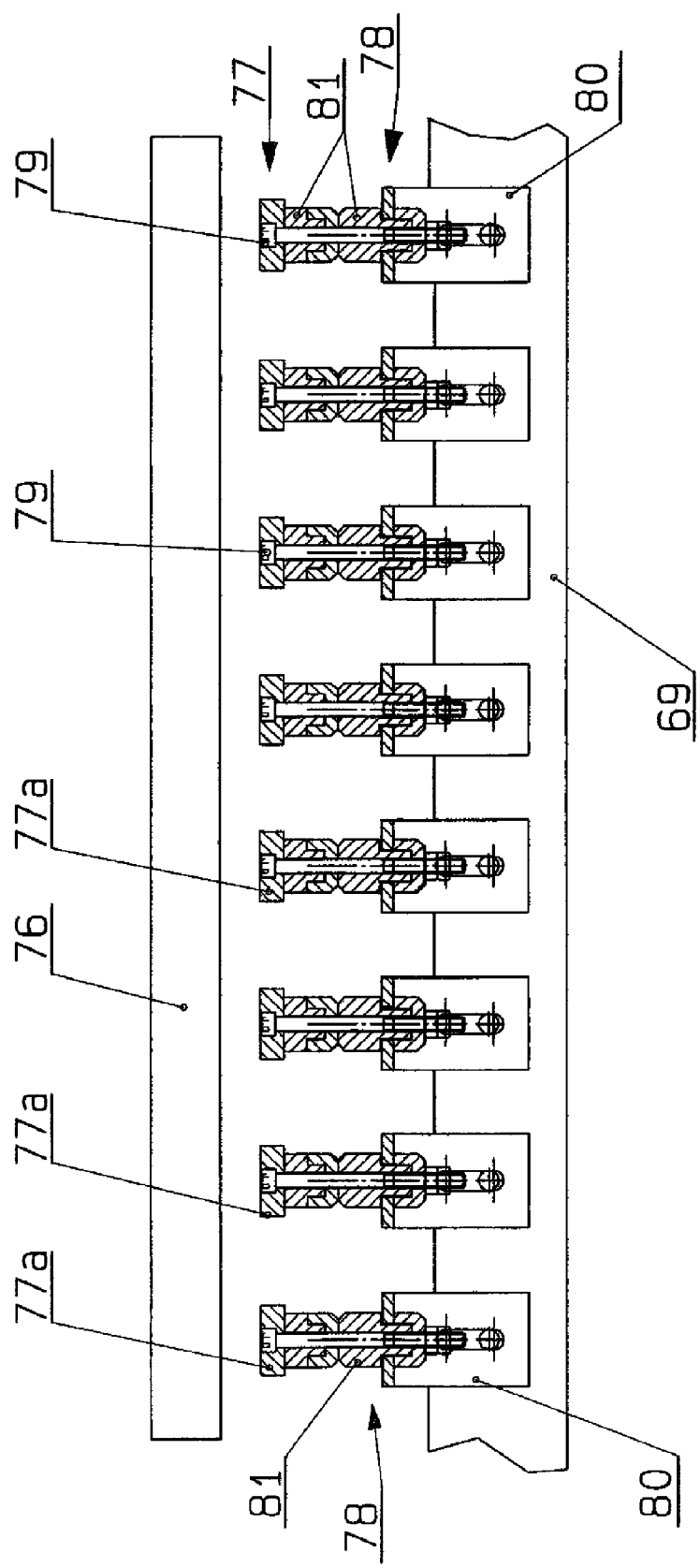
FIG. 12 shows a lower inductor, which is fixed on the oven framework.

FIG. 12 shows a lower inductor 77, which is arranged below the rear side of a susceptor plate 76, with eight inductor bars 77a, which are arranged next to one another and are fixed, in each case in such a way that they are vertically adjustable, via electrically insulating fixing apparatuses 78 on a lower transverse support 69 of the oven framework 7. The flat inductor bars 77a, which are arranged above the lower transverse support 69, are arranged at the upper ends of the fixing apparatuses 78 and are fixed, via vertical fixing screws 79, to the horizontally arranged, upper limbs of L-shaped fixing clips 80, which are fixed, in each case in such a way that they are vertically adjustable, with their vertically arranged, lower limbs on the lower support 69. In each case a plurality of electrically insulating intermediate pieces 81 are arranged between the fixing screws 79 and the upper limbs of the fixing clips 80.

FIGS. 18-22 show a baking oven 82 for producing baked molded products, which are in the form of rectangular, crunchy/crispy wafer sheets, which are produced from a liquid wafer dough in baking molds formed by two baking plates.

The baking molds are accommodated in the baking tongs 83 of a continuous baking tong chain 84. The baking tong chain 84 is arranged along a circulation path, which extends in two horizontal transport paths 85, 86, which are arranged one above the other, through the baking oven 82. The baking tong chain 84 is integrated in a chain conveyor, which is arranged along the circulation path, conveys the baking tongs 83 through the two transport paths 85, 86 and, via its chain wheels arranged on the front and rear end of the baking oven 82, deflects them from one transport path into the other.

The chain conveyor is arranged in the elongated framework 87 of the baking oven 82 between the two oven side walls 88, 89. The baking tongs 83 are arranged in the chain conveyor between two lateral transport chains 90, 91 and are fixed on the chain link plates 90a, 91a thereof. Hinged bolts protrude outwards from the transport chains 90, 91, on which hinged bolts running wheels 92, 93 are mounted rotatably, with which the chain conveyor is supported in both transport paths 85, 86 in each case on running rails 94, 95, 96, 97, which run in the oven longitudinal direction and are fixed on the two side walls 88, 89 of the oven framework 87.

Figure 21:
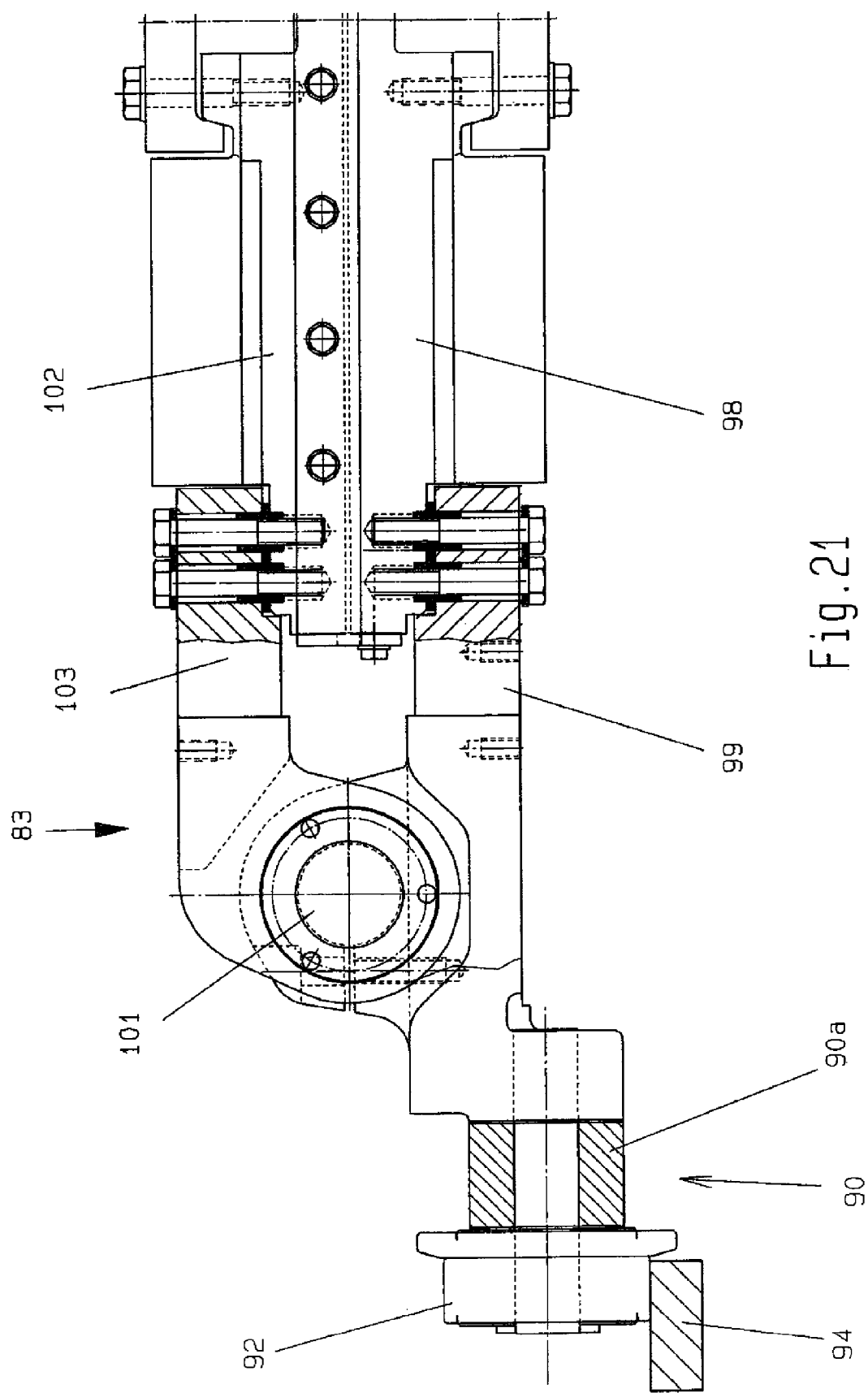
FIG. 21 shows the left-hand half of a baking tong of the baking oven from FIG. 18.
Figure 22:
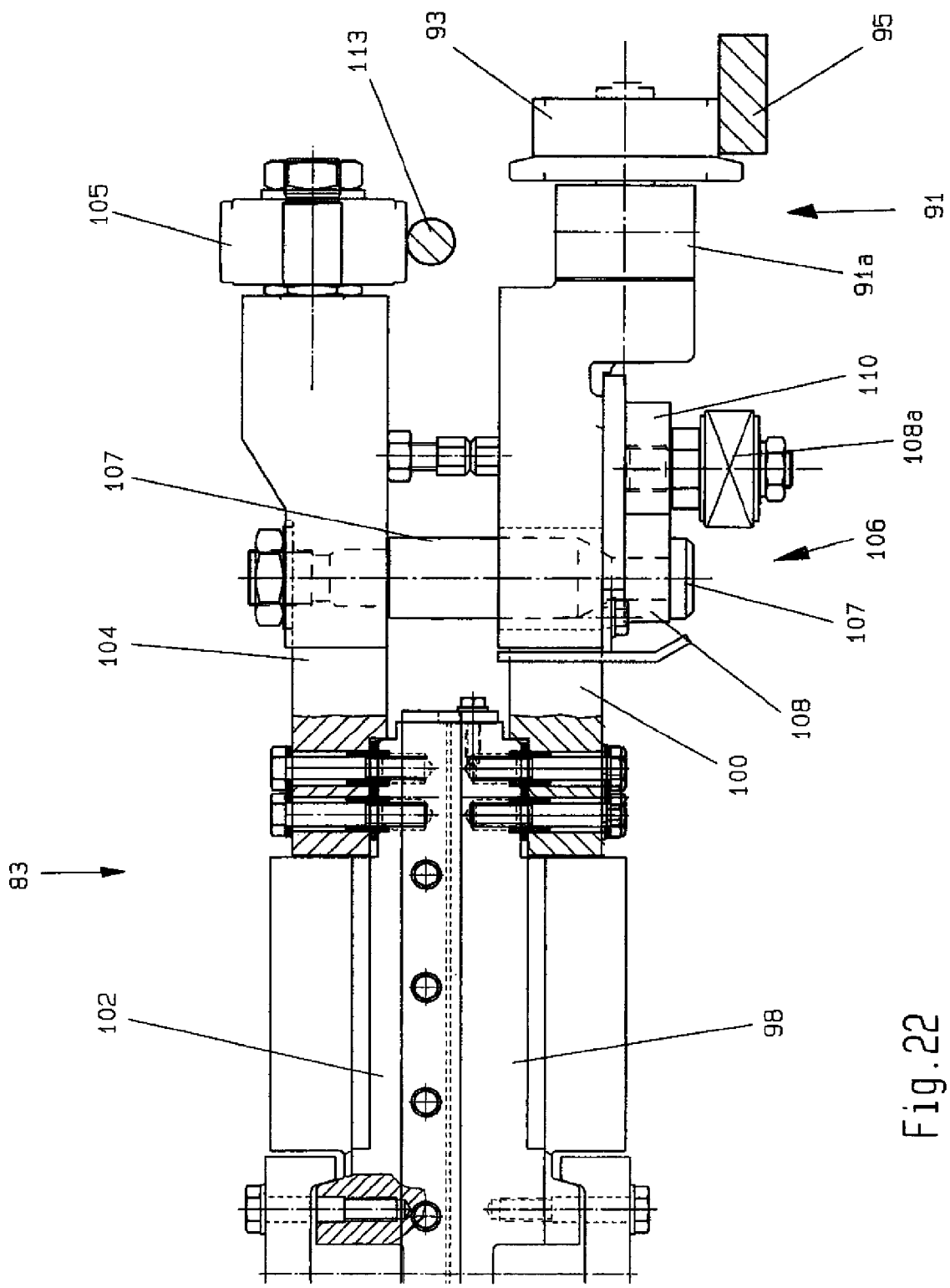
FIG. 22 shows the right-hand half of a baking tong of the baking oven from FIG. 18.
Figure 23:
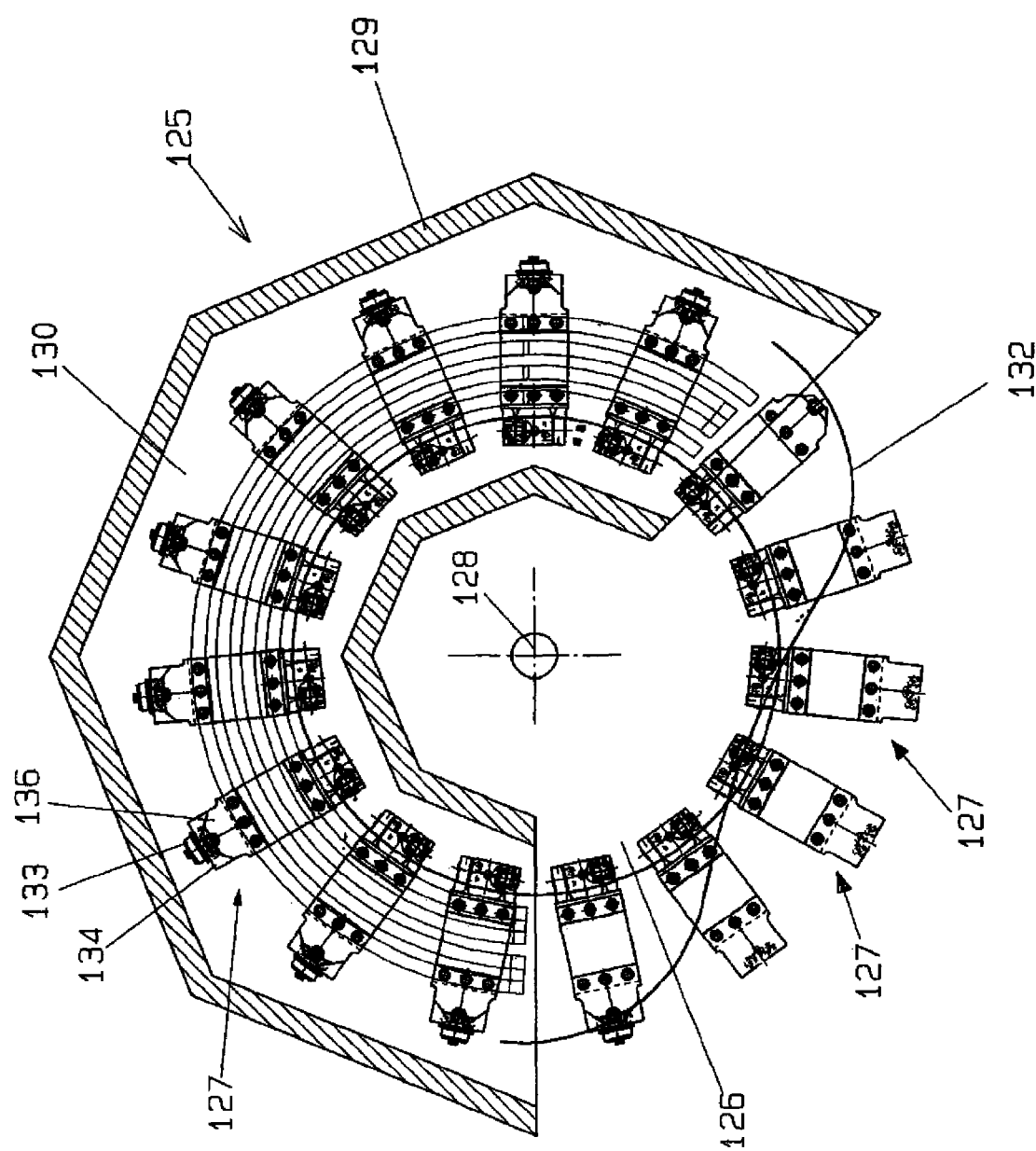
FIG. 23 shows a further baking oven equipped with baking tongs, in plan view.
Figure 24:
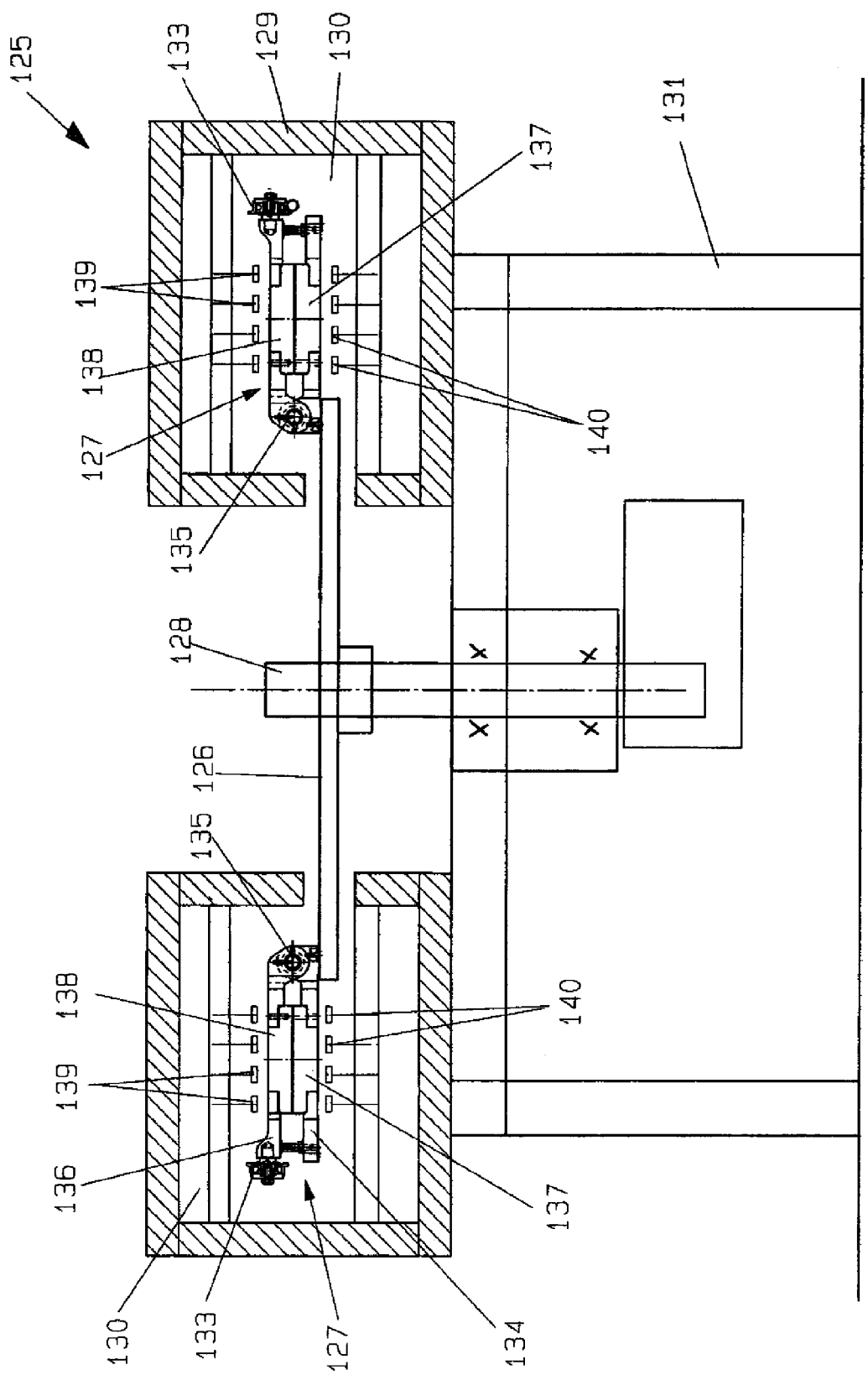
FIG. 24 shows a cross section of the baking area of the baking oven from FIG. 23.

FIGS. 21 and 22 show a baking tong 84 of the baking oven 82.

In the case of each baking tong 83, a lower baking plate in the form of a susceptor plate 98 is arranged in the lower tong part between a left-hand and a right-hand, lateral edge piece 99, 100 of the lower tong part. The lower tong part is connected at its two edge pieces 99, 100 via horizontal bolts to the chain link plates 90a, 91a of the lateral transport chains 90, 91 of the chain conveyor. A hinge 101, which pivotably connects the lower tong part to the upper tong part, is fitted to the left-hand edge piece 99 of the lower tong part. In the upper tong part, an upper baking plate in the form of a susceptor plate 102 is arranged between a left-hand and a right-hand lateral edge piece 103, 104 of the upper tong part. The left-hand edge piece 103 of the upper tong part is connected to the hinge 101 and a control roller 105 is fitted on the right-hand edge piece 104 of the upper tong part, with the aid of which control roller 105 the baking tong 83 is opened and closed by the upper tong part being pivoted. The two susceptor plates 98, 102 each have a rear side, which is arranged on the outside of the baking tong 83 and via which they can be inductively heated without any contact, and a front side, which is arranged in the interior of the baking tong 83 and on which the baking face of the upper or lower baking plate is arranged. When the baking tong 83 is closed, the two susceptor plates 98, 102 are positioned one above the other in such a way that they are aligned horizontally, and the baking faces arranged on their front sides face one another.

The baking tongs 83 are each provided with a baking tong locking apparatus 106. The apparatus 106 provides a rigid locking element, which is formed by a bolt 107, which is fitted on the right-hand edge piece 104 of the upper tong part and protrudes beyond the front side of the upper tong part. The apparatus 106 provides a movable locking element, which is formed by a pivotable hook 108. The hook 108 in the case of the right-hand edge piece 100 of the lower tong part is arranged on the underside next to a through-opening, which passes through the edge piece 100, for the bolt 107. A control roller 108a protrudes downwards from the hook 108, with the aid of which control roller 108a the hook 108 can be pivoted about its pivot axis, which is arranged at right angles with respect to the edge piece 100. When the baking tong 83 closes, the upper tong part pivots towards the lower tong part and the bolt 107 is inserted into the through-opening in the right-hand edge piece 100 of the lower tong part. At the end of the closing movement, the bolt 107 is arranged vertically and the free bolt end 109 protrudes downwards beyond the rear side of the right-hand edge piece 100 of the lower tong part. The hook 108 is pivoted with the aid of the control roller 108a about its pivot axis, which is parallel to the bolt 107. The hook 108 is pivoted with its hook head 110 towards the bolt 107 until the hook head 110 engages in a lateral circumferential groove of the bolt 107. Before the baking tong 83 opens, the hook 108 is pivoted away from the bolt 107 with its hook head 110 and the bolt 107 is released.

In the front oven half 82a, an output station 111, an input station 112, a device 113 for opening and closing the baking tongs 83 and an actuating apparatus 114 for the baking tong locking apparatuses 106 of the baking tongs 83 are arranged on the upper transport path 85. In the output station 111, baked, crispy/crunchy wafer sheets are removed from the open baking tongs 83. In the input station 112, liquid wafer dough is introduced into the open baking tongs 83. Downstream of the input station 112, the baking tongs 83 are closed by the device 113. The device 113 provides a guide rod, which is arranged along the upper transport path 85 and along which the baking tongs 83 run with their control rollers 105 and are opened and closed by the control rollers 105.

The actuating apparatus 114 for the baking tong locking apparatuses 106 provides a stationary, sloping rod, which protrudes into the path of the control roller 108a of the hook 108 of the baking tong locking apparatus 106. In the case of each closed baking tong 83 which runs past the actuating apparatus 114, the control roller 108a of the hook 108 of the baking tong locking apparatus 106 comes into engagement with the sloping rod of the actuating apparatus 114. As a result of this engagement, the hook 108 is pivoted via the control roller 108a and the baking tong locking apparatus 106 is locked. The chain conveyor conveys the closed and locked baking tongs 83 rearwards towards the rear end of the baking oven 82 in the upper transport path 85 and, in the lower transport path 86, forwards towards the front end of the baking oven 82. In the front oven half 82a, a second actuating apparatus 115 for the baking tong locking apparatuses 106 of the baking tongs 83 is arranged on the lower transport path 86. The second actuating apparatus 115 provides a sloping rod, which protrudes into the path of the control roller 108a and, in the case of each closed and locked baking tong 83, which runs past it, comes into engagement with the control roller 108a of the hook 108 of the baking tong locking apparatus 106, pivots the hook 108 and unlocks the baking tong locking apparatus 106.

The baking oven 82 is provided with an induction heating device. The baking area 116 is accommodated in the rear oven half 82b. In the baking area 116, an upper baking zone 117 is arranged on the upper transport path 85 and a lower baking zone 118 is arranged on the lower transport path 86. Elongated, upper and lower inductors 119, 120, 121, 122 are provided in the two baking zones 117, 118 and are connected, via electrical lines 123, to an AC generator 124, which is arranged next to the front oven half 82a and supplies the inductors 119, 120, 121, 122 with current. The inductors 119, 120, 121, 122 are arranged in the two baking zones 117, 118 in each case above or below the closed baking tongs 83. They produce in each case one large-area, broad and elongated magnetic field, which extends over a plurality of baking tongs 83, which are arranged one behind the other.

In the upper baking zone 117, an elongated, upper inductor 119 is arranged over the baking tongs 83 and an elongated, lower inductor 120 is arranged below the baking tongs 83. The magnetic field produced by the upper inductor 119 reaches downwards as far as the baking plates, which are arranged on the upper sides of the baking tongs 83 and are in the form of susceptor plates 102. These susceptor plates 102 are inductively heated by means of the magnetic field which is produced by the upper inductor 119 without any contact. The magnetic field produced by the lower inductor 120 reaches upwards as far as the baking plates which are arranged on the undersides of the baking tongs 83 and are in the form of susceptor plates 98. These susceptor plates 98 are inductively heated by the magnetic field produced by the lower inductor 120 without any contact.

In the lower baking zone 118, an elongated, upper inductor 121 is arranged over the baking tongs 83 and an elongated, lower inductor 122 is arranged below the baking tongs 83. The magnetic field produced by the upper inductor 121 reaches downwards as far as the baking plates which are arranged on the upper sides of the baking tongs 83 and are in the form of susceptor plates 98. These susceptor plates 98 are inductively heated by the magnetic field produced by the upper inductor 121 without any contact. The magnetic field produced by the lower inductor 122 reaches upwards as far as the baking plates which are arranged on the undersides of the baking tongs 83 and are in the form of susceptor plates 102. These susceptor plates 102 are inductively heated by the magnetic field produced by the lower inductor 122.

The inductors 119, 120, 121, 122 extend in the respective baking zone 117, 118 along the circulation path of the baking tongs 83 over a plurality of baking tongs 83 arranged one behind the other. The inductors 119, 120, 121, 122 each produce a broad magnetic field, which extends along the circulation path of the baking tongs 83 over a plurality of baking tongs 83 arranged one behind the other and, in the case of the baking tongs 83 arranged one behind the other, inductively heats the baking plates which are in the form of susceptor plates 98, 102, without any contact. The inductors 119, 120, 121, 122 can have different designs. They can have the designs illustrated in FIGS. 13-17. The fixing of the inductors 119, 120, 121, 122 in the framework 87 of the baking oven 82 corresponds in each case to the fixing explained above in connection with FIGS. 10-12.

FIGS. 23 to 27 show a baking oven 125, in which a plurality of baking tongs 127 are arranged next to one another along a circular path on a horizontal, round turntable 126 and are conveyed along the circular path through the baking oven by means of the rotary movement of the turntable 126. The turntable 126 can be rotated about a vertical axis of rotation 128. The baking oven 125 has an annular or polygonal housing 129, which extends along the circular path and in which the baking area 130 of the baking oven 125 is arranged. The housing 129 is arranged on a lower framework 131. The housing 129 is designed to be open at the front side of the baking oven 125. The input station and the output station of the baking oven 125 are arranged in the open region of the housing 129. A guide rod 132, which is arranged along the circular path and along which the baking tongs 127 run with their control rollers 133 and are opened and closed by the control rollers 133, is provided in the open region of the housing 129.

Each baking tong 127 has a lower tong part 134, which is fixed on the turntable 126 and is connected pivotably to an upper tong part 136 via a hinge 135, which upper tong part 136 bears the control roller 133 at its free end. A lower baking plate in the form of a susceptor plate 137 is arranged in the lower tong part 134 and an upper baking plate in the form of a susceptor plate 138 is arranged in the upper tong part 136. The two susceptor plates 137, 138 each have a rear side, which is arranged on the outside of the baking tong 127 and via which they can be inductively heated without any contact, and a front side, which is arranged in the interior of the baking tong 127 and on which the baking face of the upper or lower baking plate is arranged. When the baking tong 127 is closed, the susceptor plates 137, 138 are positioned one above the other in such a way that they are aligned horizontally and the baking faces, which are arranged on their front sides, face one another.

The baking tongs 127 are conveyed by the rotary movement of the turntable 126 along the circular path through the baking area 130. A baking zone, which runs along the circular path, is provided in the baking area 130. In said baking zone, an elongated, arcuate, upper inductor 139 is arranged above the circular path and an elongated, arcuate, lower inductor 140 is arranged below the circular path. The two inductors 139, 140 produce a large-area, broad, elongated, arcuate magnetic field, which extends along the circular path over a plurality of baking tongs 127 arranged next to one another. The magnetic field produced by the upper inductor 139 reaches therefrom downwards as far as into the upper tong parts of the baking tongs 127, in which the upper baking plates in the form of susceptor plates 138 are inductively heated without any contact. The magnetic field produced by the lower inductor 140 reaches therefrom upwards as far as into the lower tong parts of the baking tongs 127, in which the lower baking plates in the form of susceptor plates 137 are inductively heated without any contact.

Figure 25:
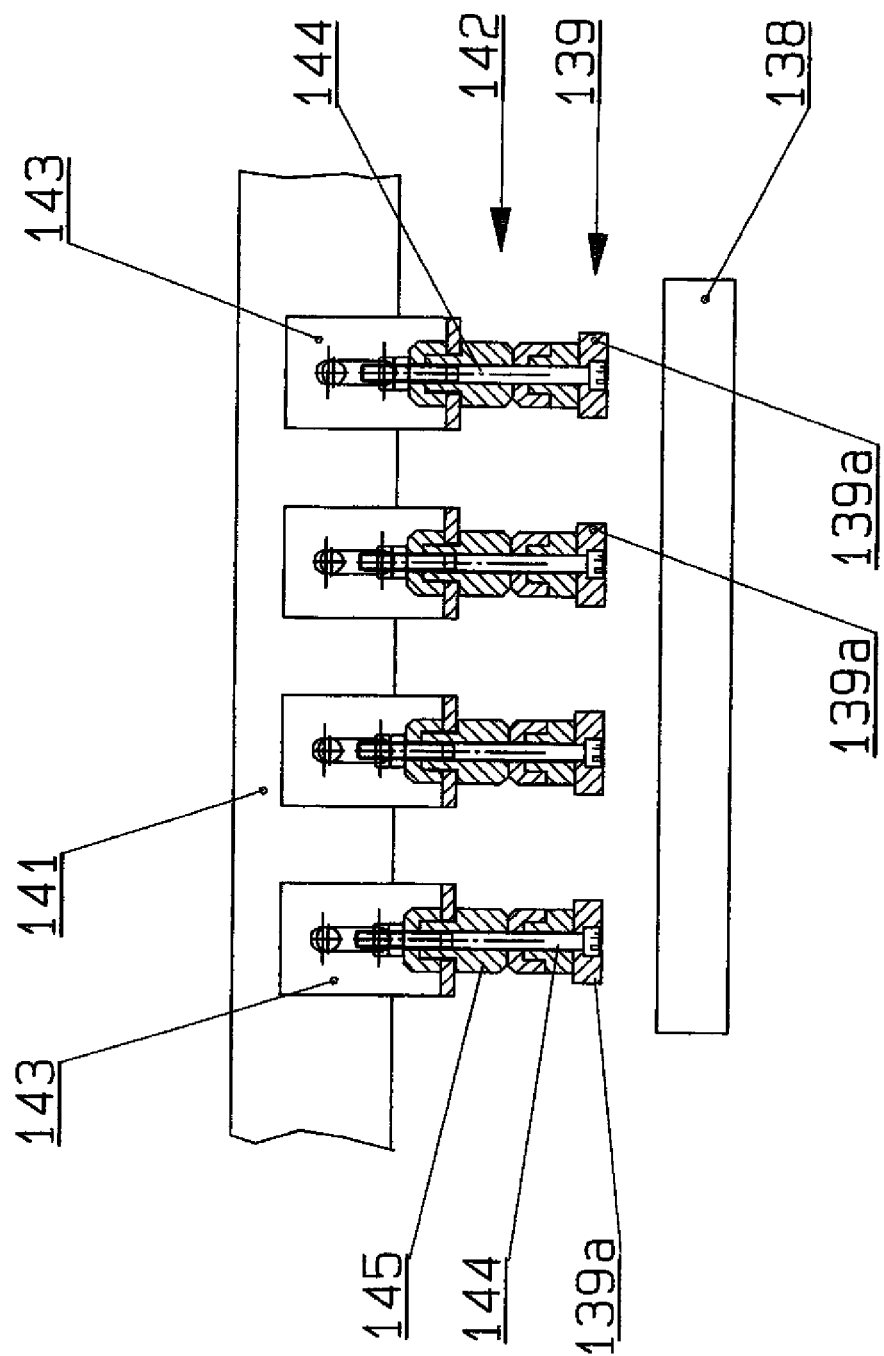
FIG. 25 shows the fixing of the upper inductor in the baking oven from FIG. 23.

The upper inductor 139 is arranged in the housing 129 just above the upper baking plates, which are in the form of susceptor plates 138, of the closed baking tongs 127. It is fixed in the housing 129 on an upper support 141, which runs transversely with respect to the circular path. It has four inductor bars 139*a* arranged next to one another. Said inductor bars 139*a* are in the form of flat, solid bars, which have a low, rectangular full cross section. The flat inductor bars 139*a* are fixed on the upper support 141 via electrically insulating fixing apparatuses 142. The fixing apparatuses 142 provide L-shaped fixing clips 143, which are fixed with their vertically arranged, upper limbs on the support 141 in such a way that they are vertically adjustable. The flat inductor bars 139*a* are arranged on the lower ends of the fixing apparatuses 142 and are fixed on the horizontally arranged, lower limbs of the fixing clips 143 via vertical fixing screws 144. In each case a plurality of electrically insulating intermediate pieces 145 are arranged between the fixing screws 144 and the lower limbs of the fixing clips 143 (FIG. 25).

Figure 26:
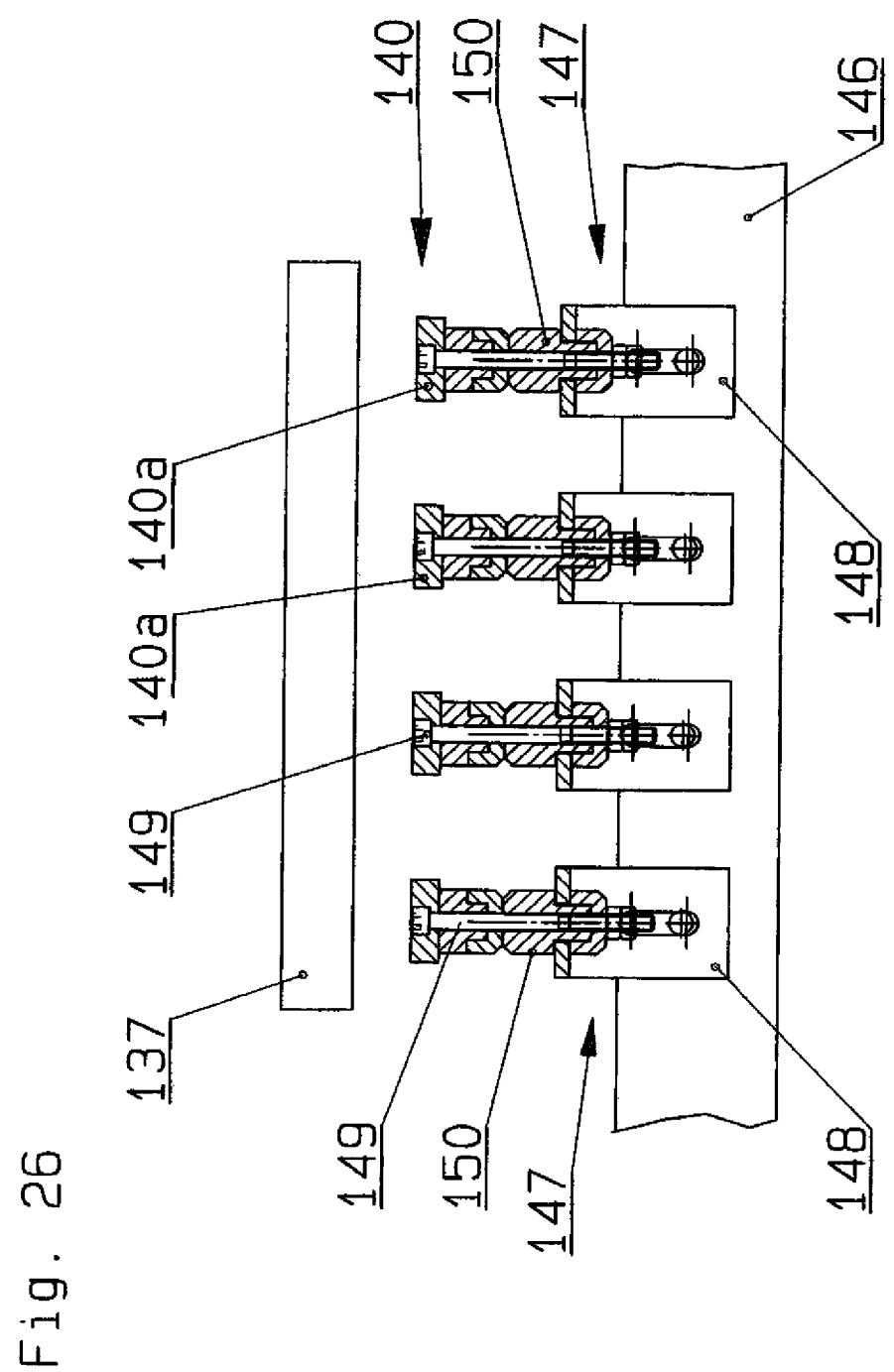
FIG. 26 shows the fixing of the lower inductor in the baking oven from FIG. 23.
Figure 27:
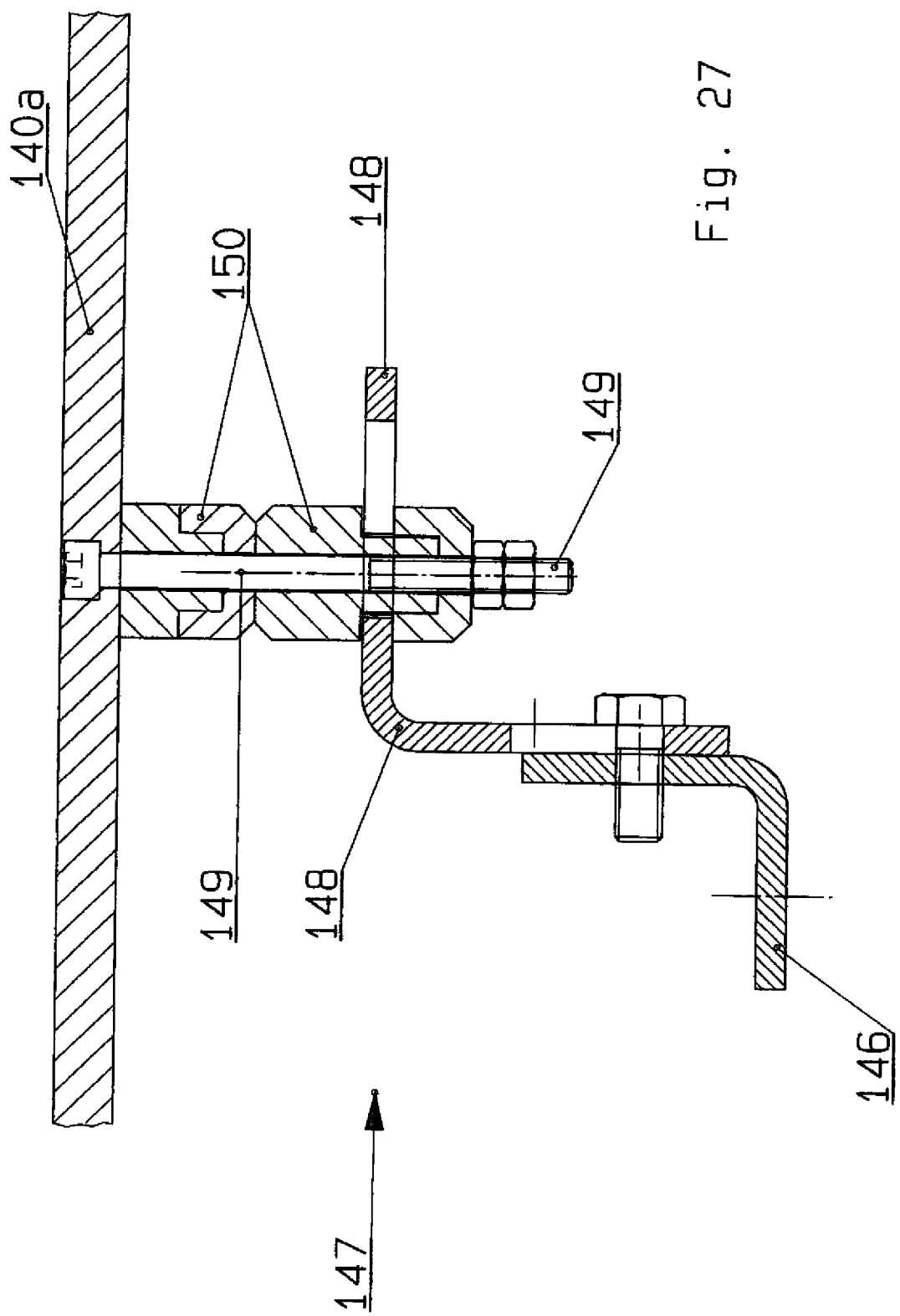
FIG. 27 shows the fixing of an inductor bar in the baking oven from FIG. 23.
Figure 28:
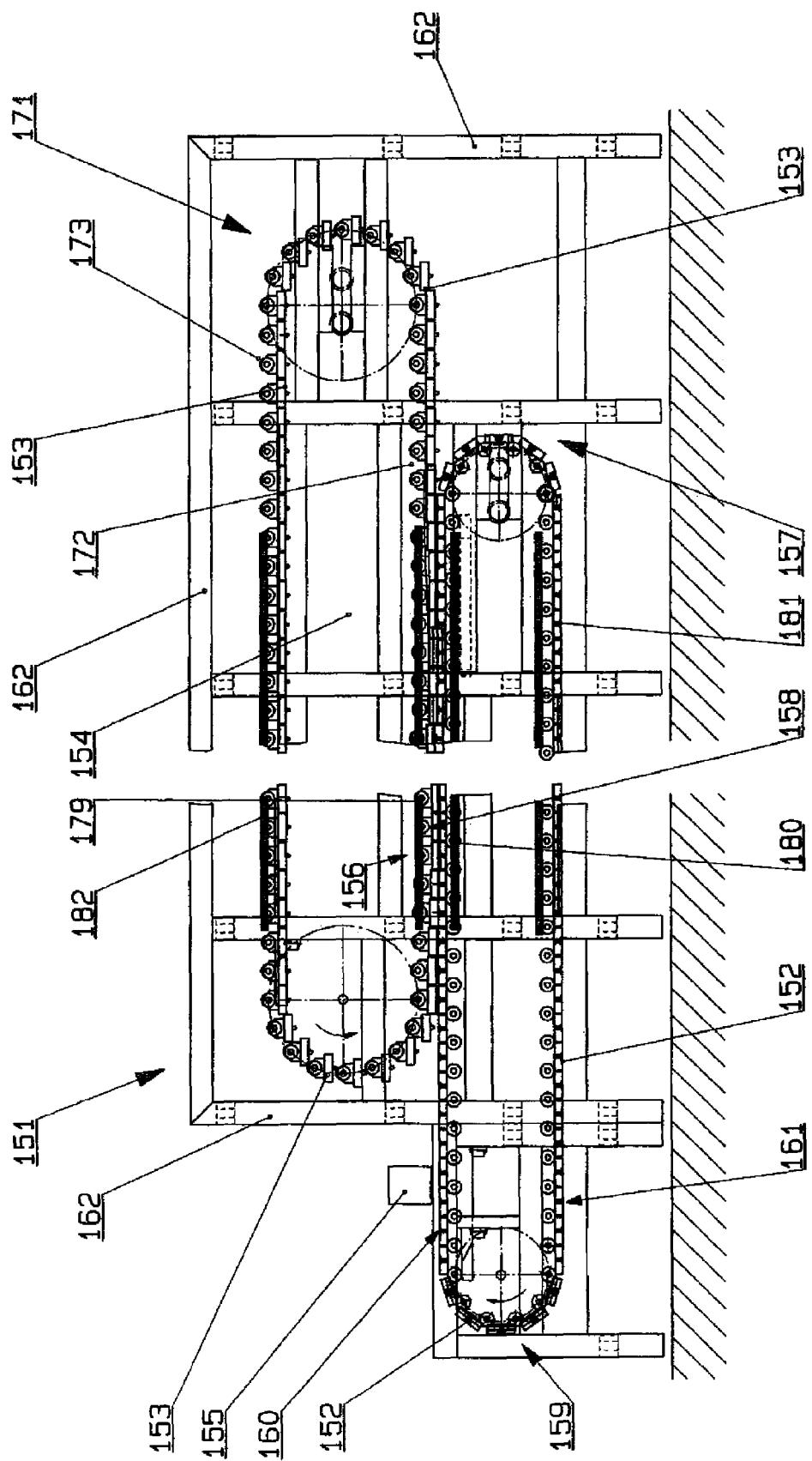
FIG. 28 shows a further baking oven according to the invention, from the side.
Figure 29:
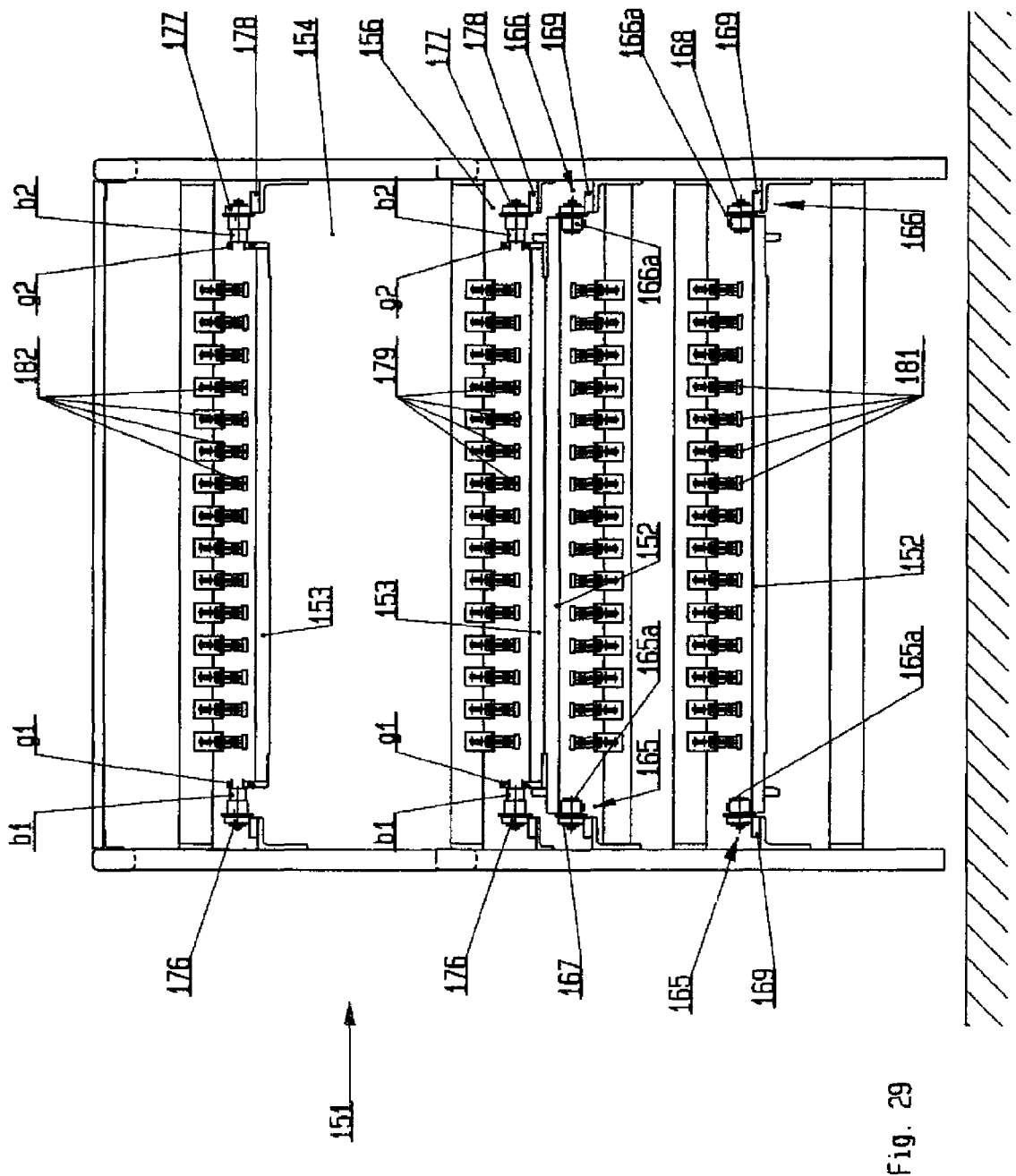
FIG. 29 shows a cross section of the baking oven from FIG. 28.
Figure 30:
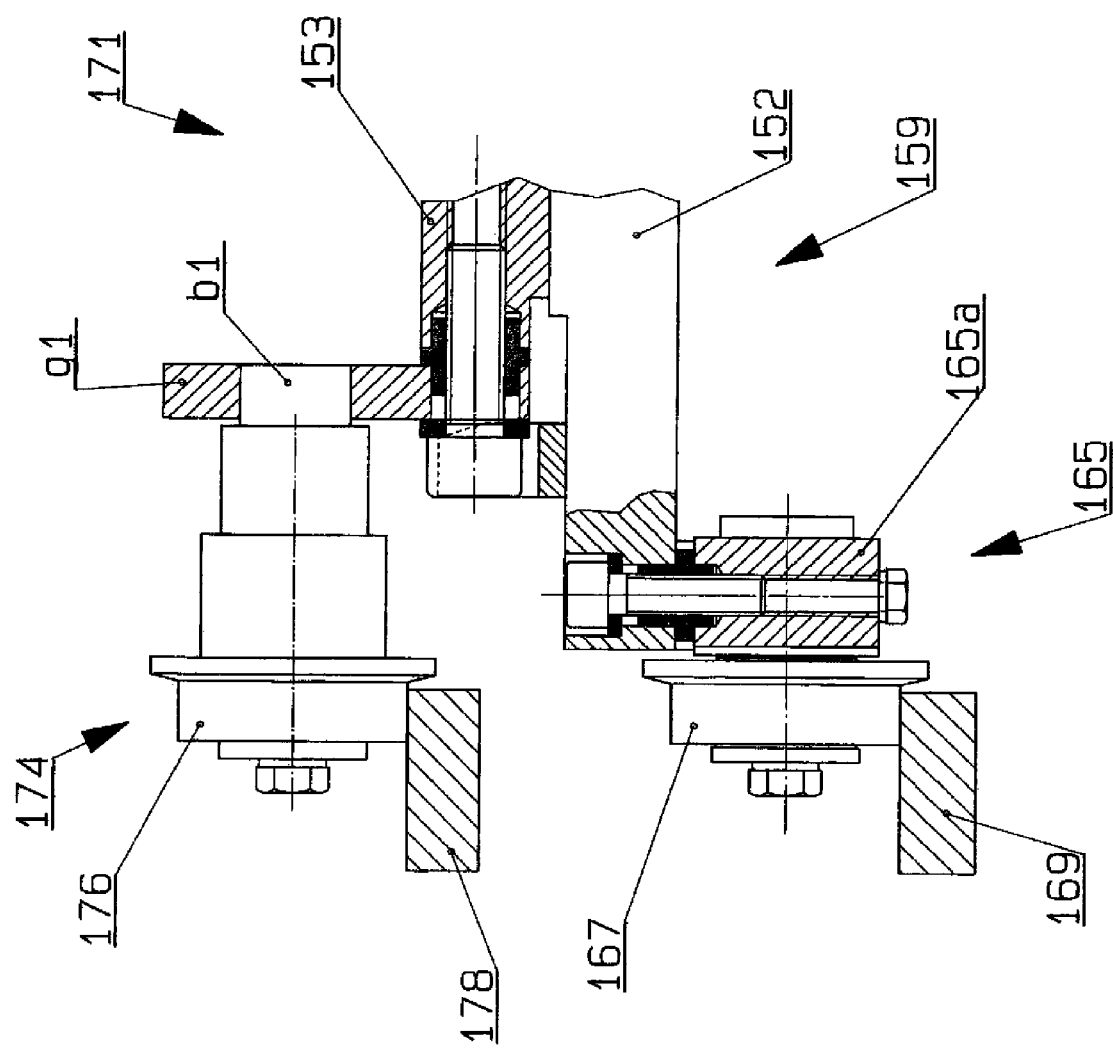
FIG. 30 shows the left-hand side edge of a baking mold of the baking oven from FIG. 28.
Figure 31:
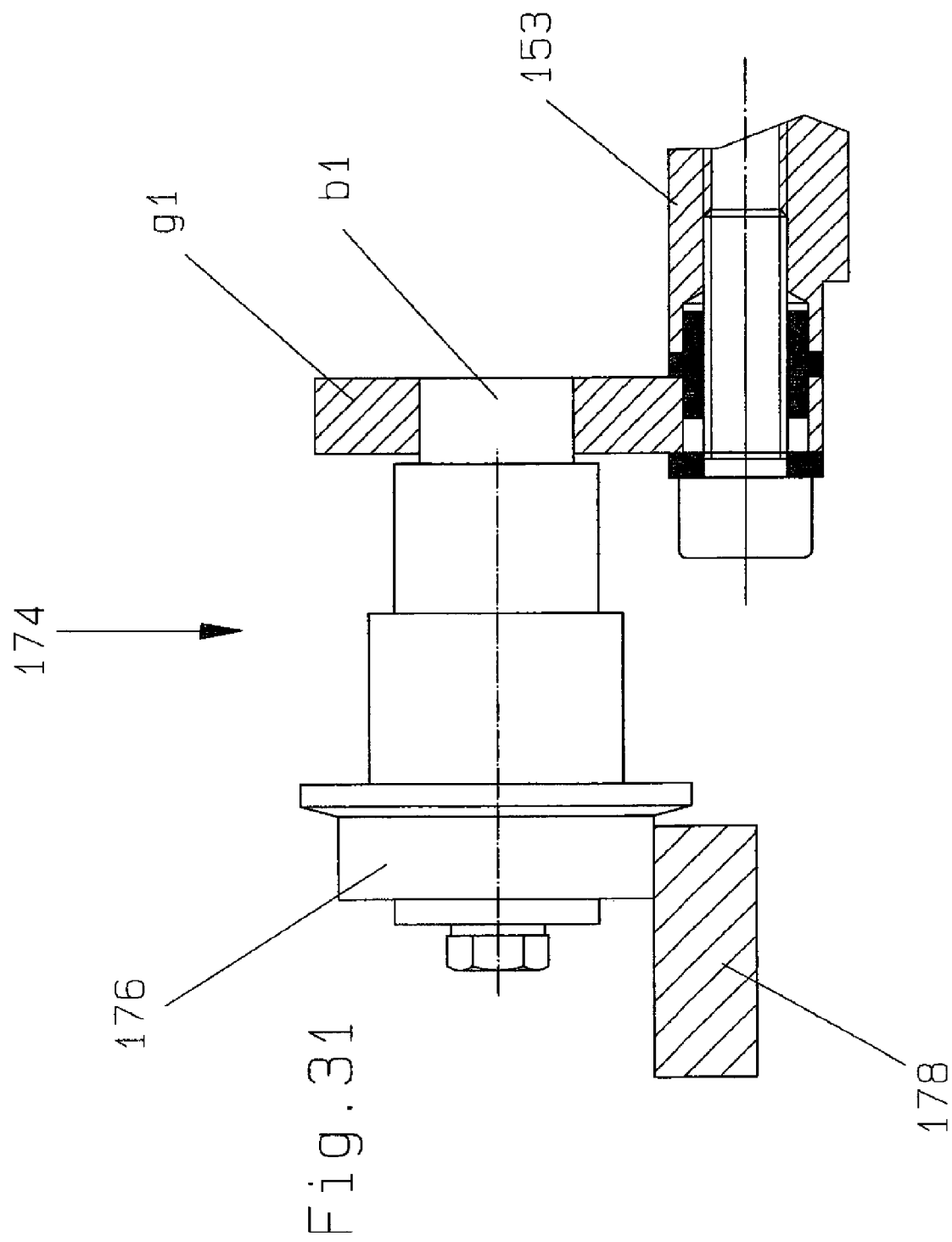
FIG. 31 shows a detail of the upper baking plate conveyor of the baking oven from FIG. 28.

The lower inductor 140 is arranged in the housing 129 just below the lower baking plates, which are in the form of susceptor plates 137, of the closed baking tongs 127. It is fixed in the housing 129 on a lower support 146, which runs transversely with respect to the circular path. It has four inductor bars 140*a*, which are arranged next to one another. Said inductor bars 140*a* are in the form of flat, solid bars, which have a low, rectangular full cross section. The flat inductor bars 140*a* are fixed on the lower support 146 via electrically insulating fixing apparatuses 147. The fixing apparatuses 147 provide L-shaped fixing clips 148, which are fixed with their vertically arranged, lower limbs on the support 146 in such a way that they are vertically adjustable. The flat inductor bars 140*a* are arranged at the upper ends of the fixing apparatuses 147 and are fixed to the horizontally arranged, upper limbs of the fixing clips 148 via vertical fixing screws 149. In each case a plurality of electrically insulating intermediate pieces 150 are arranged between the fixing screws 149 and the lower limbs of the fixing clips 148 (FIG. 26).

FIGS. 28 to 31 show a baking oven 151 for producing baked molded products, in baking molds, which each comprise two baking plates 152, 153 arranged one above the other. These baking molds are arranged one behind the other in the baking area 154 along a horizontal baking stretch. The baking stretch extends from the input station 155 of the baking oven 151 through a baking zone 156 arranged in the baking area 154 to the output station 157 of the baking oven 151. Portions of dough are applied to the lower baking plates 152 of the baking mold in the input station 155. At the beginning of the horizontal baking stretch 158, the upper baking plates 153 are lowered onto the lower baking plates 152 and as a result the baking molds are closed. In the output station 157, the upper baking plates 153 are lifted off from the lower baking plates 152 and the baked molded products are output from the baking molds opened thereby.

A lower chain conveyor 159 is arranged in the baking oven 151 below the horizontal baking stretch 158, which chain conveyor 159 bears the lower baking plates 152, which are arranged along a lower circulation path. The lower circulation path extends in two horizontal transport paths 160, 161, which are arranged one above the other, through the lower part of the baking oven 151. The transport path 160 on the upper side of the chain conveyor 159 is arranged along the horizontal baking stretch 158 and forms the baking section of the chain conveyor 159. The transport path 161 on the underside of the chain conveyor 159 forms the return section of the chain conveyor 159. The chain conveyor 159 conveys its baking plates 152 through the two transport paths 160, 161 and deflects them at its front and rear end via chain wheels from one transport path to the other.

The chain conveyor 159 is arranged in the elongated framework 162 of the baking oven 151 between the two side walls 163, 164 of the oven framework 162 in the lower part of the baking oven 151. The chain conveyor 159 has two lateral transport chains 165, 166, between which the lower baking plates 152 are arranged. The transport chains 165, 166 are provided with laterally protruding hinged bolts, on which in each case running wheels 167, 168 are mounted rotatably, with which the chain conveyor 159 in the case of the two transport paths 160, 161 is supported on running rails 169, which run in the oven longitudinal direction and are fixed on the side walls 163, 164. The transport chains 165, 166 are in the form of plate link chains. The lower baking plates 152 are fixed with their lateral edge pieces on the chain link plates 165a, 166a of the two transport chains 165, 166. The lower baking plates 152 are in the form of susceptor plates which can be inductively heated via their exposed rear sides without any contact and whose front sides bear the baking faces of the lower baking plates 152. Electrically insulating interlayers 170, which prevent metallic contact between the chain link plates 165a, 166a and the lower baking plates 152, are arranged between the chain link plates 165a, 166a and the lower baking plates 152.

In the baking oven 151, an upper chain conveyor 171 is arranged above the horizontal baking stretch 158 and bears the upper baking plates 153, which are arranged along an upper circulation path. The upper circulation path extends in two horizontal transport paths 172, 173, which are arranged one above the other, through the upper part of the baking oven 151. The transport path 172 on the underside of the chain conveyor 171 is arranged along the horizontal baking stretch 158 and forms the baking section of the chain conveyor 171. The transport path 173 on the upper side of the chain conveyor 171 forms the return section of the chain conveyor 171. The chain conveyor 171 conveys its baking plates 153 through the two transport paths 172, 173 and deflects them at its front and rear end via chain wheels from one transport path to the other.

The upper chain conveyor 171 has two lateral transport chains 174, 175. The upper baking plates 153 are arranged between the two transport chains 174, 175 and are suspended in freely pendulous fashion on bolts b1, b2, which protrude inward from the transport chains 174, 175. The baking faces are arranged on the downwardly pointing front sides of the upper baking plates 153. The upper baking plates 153 bear, on their lateral edge pieces, upwardly protruding suspension means g1, g2, with which they are suspended in freely pendulous fashion on the bolts b1, b2 of the transport chains 174, 175. The upper baking plates 153 are held in their position with the baking faces pointing downward by means of the force of gravity. The upper baking plates 153 are in the form of susceptor plates which can be inductively heated via their upwardly pointing rear sides without any contact. Electrically insulating interlayers 176, which prevent metallic contact between the suspension means g1, g2 and the upper baking plates 153, are arranged between the susceptor plates and the suspension means g1, g2 of the upper baking plates 153. The transport chains 174, 175 are provided with outwardly protruding hinged bolts, on which in each case running wheels 176, 177 are mounted rotatably, with which the chain conveyor 171, in the case of the two transport paths 172, 173, is supported on running rails 178, which run in the oven longitudinal direction and are fixed on the side walls 163, 164 of the oven framework 162.

The baking oven 151 is provided with an induction heating device. The induction heating device provides, in the baking zone 156, an elongated, upper inductor 179, which produces a large-area, broad and elongated magnetic field, which extends over a plurality of baking molds arranged one behind the other. The upper inductor 179 is arranged just above the baking molds arranged along the horizontal baking stretch 158. The upper baking plates 153, which are arranged on the upper sides of the baking molds and are in the form of susceptor plates, are inductively heated by the magnetic field produced by the upper inductor 179 without any contact. The induction heating device provides, in the baking zone 156, an elongated, lower inductor 180, which produces a large-area, broad and elongated magnetic field, which extends over a plurality of baking molds arranged one behind the other. The lower inductor 180 is arranged just below the baking molds arranged along the horizontal baking stretch 158. The lower baking plates 152, which are arranged on the undersides of the baking molds and are in the form of susceptor plates, are inductively heated by the magnetic field produced by the lower inductor 179 without any contact.

The induction heating device furthermore provides additional inductors 181, 182, which are arranged on the return sections 171, 173 of the two chain conveyors 159, 171.

In the case of the return section 161 of the lower chain conveyor 159, an additional inductor 181 is provided, which produces a large-area, broad and elongated magnetic field, which extends over a plurality of lower baking plates 152 arranged one behind the other. This additional inductor 181 is arranged above the upwardly pointing rear sides of the lower baking plates 152. The lower baking plates 152, which are arranged in the return section 161 and are in the form of susceptor plates, are inductively heated by the magnetic field produced by the additional inductor 181 without any contact.

In the case of the return section 173 of the upper chain conveyor 171, a further additional inductor 182 is provided, which produces a large-area, broad and elongated magnetic field, which extends over a plurality of upper baking plates 153 arranged one behind the other. This additional inductor 182 is arranged above the upwardly pointing rear sides of the upper baking plates 153. The upper baking plates 153, which are arranged in the return section 173 and are in the form of susceptor plates, are inductively heated by the magnetic field produced by the additional inductor 182 without any contact.

The inductors 179, 180 and the additional inductors 181, 182 each extend along the path of the upper and, respectively, lower baking plates 152, 153 over a plurality of upper and, respectively, lower baking plates 152, 153 arranged one behind the other. The inductors 179, 180, 181, 182 in each case produce a broad magnetic field, which extends along the circulation path of the baking plates 152, 153 over a plurality of baking plates 152, 153 arranged one behind the other and inductively heats a plurality of baking plates 152, 153, which are arranged one behind the other and are in the form of susceptor plates, without any contact. The inductors 179, 180, 181, 182 can have different designs. They can have the designs illustrated in FIGS. 13-17. The fixing of the inductors 179, 180, 181, 182 in the framework 162 of the baking oven 151 corresponds in each case to the fixing explained above in connection with FIGS. 10 to 12.

Figure 32:
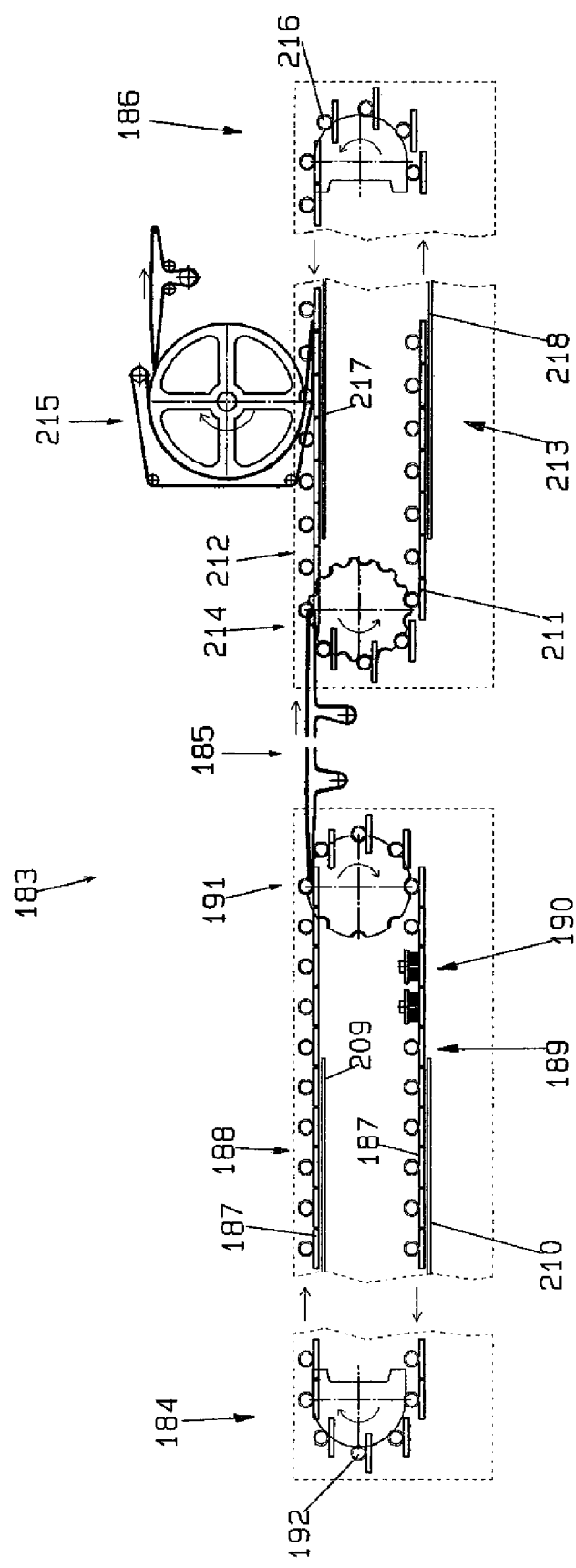
FIG. 32 shows a further baking oven according to the invention, from the side.
Figure 33:
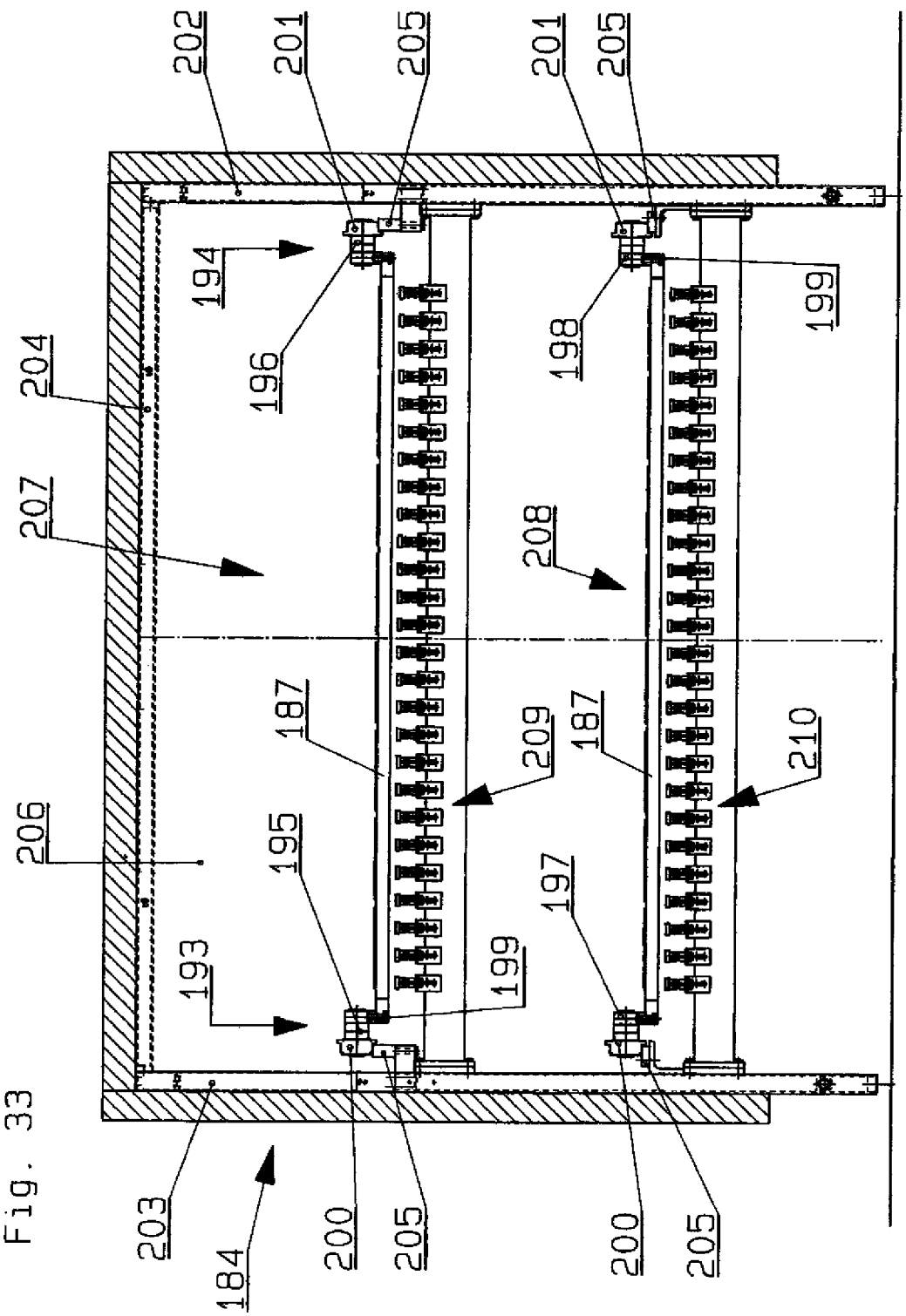
FIG. 33 shows a baking area of the baking oven from FIG. 32, in cross section.
Figure 34:
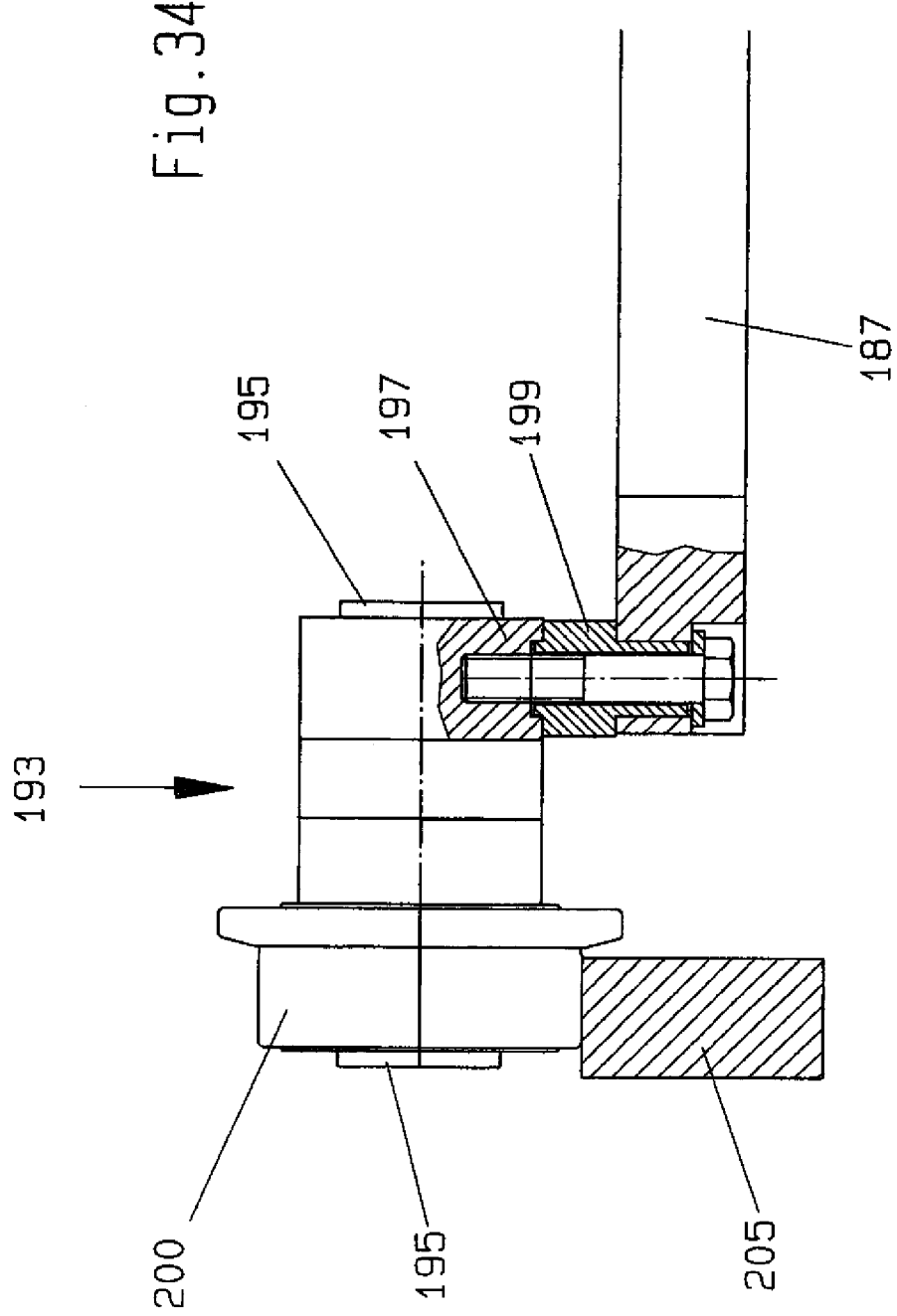
FIG. 34 shows a detail of a baking plate conveyor of the baking oven from FIG. 33.

FIGS. 32 to 34 show a baking installation 183 for producing flat molded products which are baked on both sides. The baking installation 183 provides a first baking oven 184, in which flat dough cakes are produced and are baked on the underside. A turning apparatus 185 adjoins the first baking oven 184. In said turning apparatus 185, the dough cakes which are baked on the underside are turned with the upper side down and then transferred to a second baking oven 186 with the upper side down, in which baking oven 186 the dough cakes are baked on the other side.

In the first baking oven 184, planar baking plates 187 are arranged along a circulation path, which extends along two horizontal transport paths 188, 189 arranged one above the other through the baking oven 184. The input station 190 is arranged on the lower transport path 189. In the input station 190, the flat dough cakes are produced. For this purpose, a liquid baking dough is applied to the upwardly pointing baking faces of the baking plates 187. The output station 191 is arranged at the rear end of the baking oven 184 on the upper transport path 188. In the output station 191, the dough cakes which are baked on the underside are removed from the upwardly pointing baking faces of the baking plates 187 and transferred to the turning apparatus 185.

The baking oven 184 has a chain conveyor 192, which is arranged along the circulation path of the planar baking plates 187 and circulates in the clockwise direction. The chain conveyor 192 conveys its baking plates 187 through the two transport paths 188, 189 and deflects them at its front and rear end via chain wheels from one transport path to the other. The chain conveyor 192 has two lateral transport chains 193, 194. These are each in the form of plate link chains, in which the hinged bolts protrude laterally on the inside and on the outside. The baking plates 187 are arranged between the two transport chains 193, 194 and are suspended in freely pendulous fashion on those sections of the hinged bolts 195, 196 which protrude inwards in each case from the transport chains. The baking faces are arranged on the upwardly pointing front sides of the baking plates 187. The baking plates 187 bear, on their lateral edge pieces, upwardly protruding suspension means 197, 198. These suspension means 197, 198 are used to suspend them in freely pendulous fashion on those sections of the hinged bolts 195, 196 which protrude inwards from the two transport chains 193, 194. The baking plates 187 are held in their position in which the baking faces point upwards by the force of gravity. The baking plates 187 are in the form of susceptor plates which can be inductively heated via their downwardly pointing rear sides without any contact. Electrically insulating interlayers 199, which prevent metallic contact between the suspension means 197, 198 and the baking plates 187, are arranged between the susceptor plates and the suspension means 197, 198 of the baking plates 187. Running wheels 200, 201 are mounted rotatably on those sections of the hinged bolts 195, 196 which protrude outwards from the two transport chains 193, 194, with which running wheels 200, 201 the chain conveyor 192, in the case of the two transport paths 188, 189, is supported on running rails 205, which run in the oven longitudinal direction and are fixed on the side walls 202, 203 of the oven framework 204.

In the case of the baking oven 184, two baking zones are provided in the baking area 206. An upper baking zone 207 is provided on the upper transport path 188 and a lower baking zone 208 is provided on the lower transport path 189. The baking oven 184 is provided with an induction heating device. This provides, in the case of the upper baking zone 207, an elongated inductor 209, which produces a large-area, broad and elongated magnetic field, which extends over a plurality of baking plates 187, which are arranged one behind the other and are in the form of susceptor plates. The inductor 209 is arranged just below the baking plates 187 which pass through the upper transport path 188. The induction heating device provides, in the case of the lower baking zone 208, an elongated inductor 210, which produces a large-area broad and elongated magnetic field, which extends over a plurality of baking plates 187, which are arranged one behind the other and are in the form of susceptor plates. The inductor 210 is arranged just below the baking plates 187 which pass through the lower transport path 188.

The inductors 209, 210 can have different designs. They can have the designs illustrated in FIGS. 13-17. The inductors 209, 210 differ from the inductors in these figures by the number of the inductor bars which are arranged next to one another. In the case of the inductors 209 and 210, in each case 26 inductor bars are arranged next to one another. The fixing of the inductors 209, 210 in the framework of the baking oven 184 corresponds in each case to the fixing explained above in connection with FIGS. 10-12.

In the second baking oven 186, planar baking plates 211 are arranged along a circulation path, which extends along two horizontal transport paths 211, 213, which are arranged one above the other, through the baking oven 186. The input station 214 is arranged at the front end of the baking oven 186 on the upper transport path 212. In the input station 214, the dough cakes supplied by the turning apparatus 185 are deposited on the upwardly pointing baking faces of the baking plates 211. The output station 215 is arranged in the center of the baking oven 186 on the upper transport path 212. In the output station 215, the dough cakes, which have been baked on both sides, are removed from the upwardly pointing baking faces of the baking plates 211 and output from the baking installation 183.

The second baking oven 186 has a chain conveyor 216, which is arranged along the circulation path of the planar baking plates 211 and circulates in the counterclockwise direction. The chain conveyor 216 corresponds in terms of its structural design to the chain conveyor 192 of the first baking oven 184. In the case of the chain conveyor 216, the planar baking plates 211 are likewise suspended in freely pendulous fashion on the lateral transport chains of the chain conveyor 216 and are in the form of susceptor plates, which can be inductively heated without any contact.

The second baking oven 186 is provided with an induction heating device, which, on the two transport paths 212, 213, provides in each case one elongated inductor 217, 218, which produces a large-area, broad and elongated magnetic field, which extends over a plurality of baking plates 211, which are arranged one behind the other and are in the form of susceptor plates. The inductors 217, 218 are in each case arranged just below the baking plates 211, which pass through the transport paths 212, 213 and are inductively heated by the magnetic field produced by the respective inductor 217, 218 without any contact.

The inductors 217, 218 can have different designs. They can have the designs illustrated in FIGS. 13-17. The inductors 217, 218 differ from the inductors in these figures by the number of the inductor bars which are arranged next to one another. In the case of the inductors 217, 218, in each case 26 inductor bars are arranged next to one another. The fixing of the inductors 217, 218 in the framework of the baking oven 186 in each case corresponds to the fixing explained above in connection with FIGS. 10-12.

Figure 35:
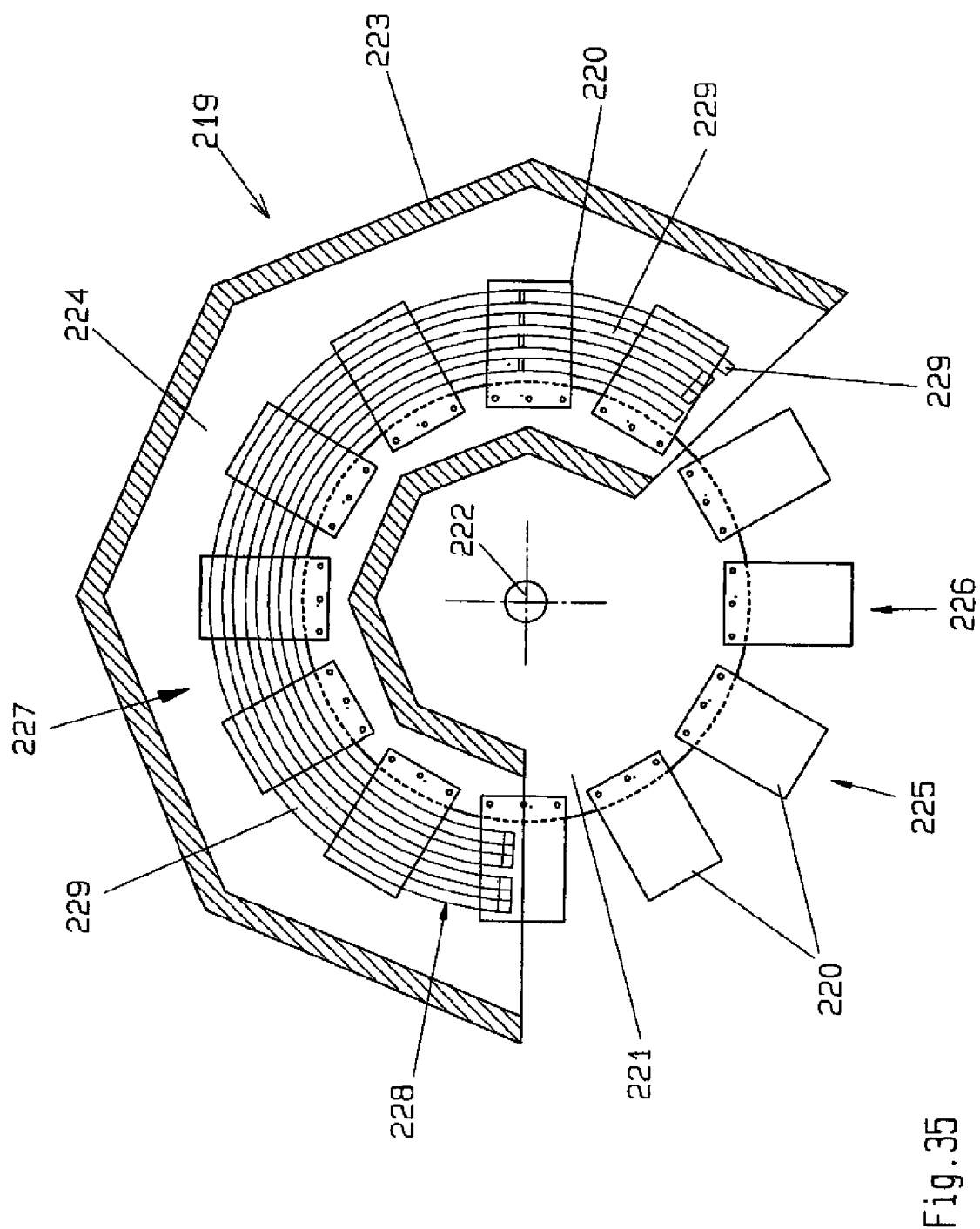
FIG. 35 shows a further baking oven according to the invention, in plan view.

FIG. 35 shows a baking oven 219 for producing flat molded products which are baked on one or both sides. The baked molded products are produced on baking plates 220, which are arranged next to one another on a horizontal turntable 221 along a circular path. The turntable 221 is capable of rotating about a vertical axis of rotation 222. The baking plates 220 are fixed on the turntable 221 and protrude radially beyond its outer edge. The baking plates 220 are moved by the rotary movement of the turntable 221 through the baking oven 219. The baking oven 219 has an annular or polygonal housing 223, which extends along the circular path of the baking plates 220 and in which a baking area 224 is arranged. The housing 223 is designed to be open on the front side of the baking oven 219. The input station 225 and the output station 226 of the baking oven 219 are arranged in the open region of the housing 223. In the input station 225, flat dough cakes are produced. For this purpose, liquid baking dough is applied to the upwardly pointing baking faces of the baking plates 220. The baking plates 220 which have been provided with the dough cakes are conveyed by the turntable 221 through the baking area 224. At the output station 226, the baked dough cakes are removed from the baking plates 220 and are output from the baking oven 219 in the form of dough cakes which have been baked on one side or, when producing dough cakes which are baked on both sides, are turned over with the upper side down and deposited on the baking plates 220 again in order that they are baked on the other side as well when they next pass through the baking area 224. The dough cakes which are baked on both sides pass through the baking area 224 twice and are only output from the baking oven 219 at the output station 226 after the second time.

The baking plates 220 of the baking oven 219 are in the form of susceptor plates which can be inductively heated without any contact. The susceptor plates 220 are inductively heated in the baking area 224 by an induction heating device 227 without any contact. The susceptor plates 220 pass the heat produced within them on to the baking faces arranged on their upper sides by means of thermal conduction, on which baking faces the dough cakes are baked.

The induction heating device 227 provides at least one elongated inductor 228, which is arranged along the circular path and extends along the circular path over a plurality of baking plates 220 arranged next to one another. The inductor 228 has a plurality of inductor bars 229, which are arranged next to one another transversely with respect to the circular path, extend along the circular path and are curved in arcuate fashion. The inductor 228 produces a broad magnetic field, which extends along the circular path over a plurality of baking plates 220 arranged next to one another and inductively heats them without any contact. The elongated inductor 228 is preferably arranged below the circular path and parallel to it. The elongated inductor 228 can also be arranged above the circular path. In the baking area 224, such an elongated inductor 228 can also be arranged above and below the circular path.

The elongated inductor 228 can have different designs. It can have one of the designs illustrated in FIGS. 13-17. The fixing of the inductor 228 in the housing 223 of the baking oven 219 corresponds to the fixing explained above in connection with FIGS. 10-12.

The invention claimed is:

1. A baking oven comprising:
an input station, a baking area with a horizontal baking zone, an output station, baking plates arranged one behind the other along a circulation path passing through said horizontal baking zone, and a conveying device for said baking plates;
said baking plates being constructed as susceptor plates for contact-free inductive heating by a single large-area, broad magnetic field extending over at least two successive said baking plates;
a single elongated inductor disposed in said horizontal baking zone and extending along said circulation path over said at least two successive susceptor plates for generating the single large-area broad magnetic field.

2. The baking oven according to claim 1, wherein said single elongated inductor is disposed beneath said circulation path.

3. The baking oven according to claim 1, wherein said single elongated inductor is disposed above said circulation path.

4. The baking oven according to claim 1, wherein said single elongated inductor is disposed above said circulation path and further including a second said single elongated inductor is disposed beneath said circulation path.

5. The baking oven according to claim 1, wherein said circulation path includes two circulation path sections disposed one above another and each passing through a respective said horizontal baking zone disposed in said baking area one above another, each said horizontal baking zone having at least one respective said single inductor disposed therein.

6. The baking oven according to claim 5, wherein said single elongated inductor is disposed beneath said circulation path section in each said horizontal baking zone.

7. The baking oven according to claim 5, wherein said single elongated inductor is disposed above said circulation path section in each said horizontal baking zone.

8. The baking oven according to claim 5, wherein said single elongated inductor is two single elongated inductors, one said single elongated inductor disposed above and one said single elongated inductor disposed below said circulation path section in each said horizontal baking zone.

9. The baking oven according to claim 1, wherein said baking plates are fixed on a common turntable rotatable about a vertical axis, said circulation path being circular, and said singular elongated inductor being an elongated arcuate inductor disposed along said circulation path.

10. The baking oven according to claim 9, wherein said elongated arcuate inductor is disposed beneath said circulation path.

11. The baking oven according to claim 9, wherein said elongated arcuate inductor is disposed above said circulation path.

12. The baking oven according to claim 9, wherein one said elongated arcuate inductor is disposed above said circulation path and one said elongated arcuate inductor is disposed beneath said circulation path.

13. The baking oven according to claim 1, wherein said baking plates are upper and lower baking plates, said upper and lower baking plates are accommodated in upper and lower tong parts of a plurality of baking tongs arranged one behind another along said circulation path, said baking tongs are conveyed by said conveying device in a closed state through said horizontal baking zone, said horizontal baking zone being provided with a single upper elongated inductor disposed above said circulation path and contact-free inductive heating the upper baking plates of at least two successive ones of said baking tongs by a single large-area, broad magnetic field generated by said single upper elongated inductor and extending along said circulation path over the upper baking plates of at least two successive ones of said baking tongs, and said horizontal baking zone being provided with a single lower elongated inductor disposed beneath said circulation path and contact-free inductive heating the lower baking plates of at least two successive ones of said baking tongs by a single large-area, broad magnetic field generated by said single lower elongated inductor and extending along said circulation path over the lower baking plates of at least two successive ones of said baking tongs.

14. The baking oven according to claim 13, wherein said baking tongs are each fixed on a respective turntable rotatable about a vertical axis, said single elongated inductors being elongated arcuate inductors disposed along said course of said circular path.

15. The baking oven according to claim 13, wherein said baking tongs are arranged one behind another along said circulation path and said circulation path includes two circulation path sections disposed one above another and each passing through a respective said horizontal baking zone disposed in said baking area one above another, each said horizontal baking zone being provided with a single upper elongated inductor disposed above said circulation path and contact-free inductive heating the upper baking plates of at least two successive baking tongs by a single large-area, broad magnetic field generated by said single upper elongated inductor and extending along said circulation path over the upper baking plates of at least two successive baking tongs, and each said horizontal baking zone being provided with a single lower elongated inductor disposed beneath said circulation path and contact-free inductive heating the lower baking plates of at least two successive baking tongs by a single large-area, broad magnetic field generated by said single lower elongated inductor and extending along said circulation path over the lower baking plates of at least two successive baking tongs.

16. The baking oven according to claim 13, wherein each of said baking tongs has an upper tong part pivotably connected to a lower tong part by a hinge, and said baking plates accommodated by said tong parts are in each arranged between two edge pieces, which laterally adjoin said baking plates, said edge pieces are arranged on the hinge side of said baking tong, and one of said edge pieces arranged at a free end of said upper tong part having a control roller for opening and closing said baking tong.

17. The baking oven according to claim 16, wherein said baking plates are electrically insulated from said edge pieces.

18. The baking oven according to claim 16, wherein each of said baking tongs has a baking tong locking apparatus having locking elements disposed on a side edge of said baking tong which is remote from said hinge, said locking elements fitted on said edge pieces of said tong parts which are arranged on said side edge, next to said baking plates.

19. The baking oven as claimed in claim 13, wherein said upper and lower tong parts each have flat plate frames in which said upper and lower baking plates are disposed with exposed rear sides.

20. The baking oven according to claim 19, wherein said flat plate frames have lateral frame parts arranged on both sides of said baking plates, said frame parts are connected to one another by a front transverse rail arranged along a front edge of said baking plate and by a rear transverse rail arranged along a rear edge of said baking plate.

21. The baking oven according to claim 20, wherein said transverse rails are electrically insulated from said lateral frame parts.

22. The baking oven according to claim 19, wherein said baking plates are floatably mounted in said flat plate frames, or are displaceably arranged, to a limited extent, at right angles relative to a flat plate plane.

23. The baking oven according to claim 22, wherein said baking plates are displaceably arranged in transverse rails of said flat plate frames, to a limited extent, at right angles relative to a flat plate plane.

24. The baking oven according to claim 13, wherein said baking plates contain inserts embedded to form baking mold halves.

25. The baking oven according to claim 24, wherein said baking plates are cast iron or steel and said baking mold halves are aluminum.

26. The baking oven according to claim 1, wherein said baking plates each include respective upper and lower baking plates, said circulation path is an upper and a lower circulation path, each having horizontal circulation path sections passing through said horizontal baking zone along a horizontal baking stretch, said upper and lower baking plates disposed at said horizontal baking stretch are positioned opposite one another and constitute upper and lower baking mold halves, each of said upper and lower circulation paths having a respective chain conveyor for respectively carrying said upper and lower baking plates, said upper circulation path includes an upper return section remote from said horizontal baking stretch and passing from said output station back to said input station, said lower circulation path includes a lower return section remote from said horizontal baking stretch and passing from said output station back to said input station, said horizontal baking zone is provided with a single upper elongated inductor disposed above said horizontal baking stretch and contact-free inductively heating at least two successive upper baking plates by said magnetic field generated by said single upper elongated inductor and extending along said horizontal baking stretch over at least two successive upper baking plates, said horizontal baking zone is provided with a single lower elongated inductor disposed beneath said horizontal baking stretch and contact-free inductively heating at least two successive lower baking plates with said magnetic field generated by said single lower elongated inductor and extending along said horizontal baking stretch over at least two successive lower baking plates.

27. The baking oven according to claim 26, wherein said lower baking plates are disposed on said lower chain conveyor with upwardly pointing baking faces in said horizontal baking stretch said upper baking plates are disposed on said upper chain conveyor with downwardly pointing baking faces in said horizontal baking stretch, said upper baking plates are oscillatingly suspended on said upper chain conveyor, said upper chain conveyor deposits said upper baking plates on top of said lower baking plates at a beginning of said horizontal baking stretch to assemble said baking mold halves into baking molds, said baking molds are conveyed by said lower chain conveyor along said horizontal baking stretch through said horizontal baking zone, said upper chain conveyor raises said upper baking plates from said lower baking plates at the end of said horizontal baking stretch to disassemble said baking molds.

28. The baking oven according to claim 26, wherein along said lower return section of said lower circulation path, a second elongated inductor is configured for contact-free inductively heating of said lower baking plates arranged in said lower return section, said second elongated inductor extends over at least two successive lower baking plates and generates a single magnetic field extending over the lower baking plates and contact-free inductively heating the lower baking plates.

29. The baking oven according to claim 26, wherein along said upper return section of said upper circulation path, a second elongated inductor is configured for contact-free inductively heating of said upper baking plates arranged in said upper return section, said second elongated inductor extends over at least two successive upper baking plates and generates a single magnetic field extending over the upper baking plates and contact-free inductively heating the upper baking plates.

30. The baking oven according to claim 26, wherein said lower baking plates are disposed in said lower chain conveyor and are electrically insulated from said lower chain conveyor.

31. The baking oven according to claim 26, wherein said upper baking plates are disposed in said upper chain conveyor and are electrically insulated from said upper chain conveyor.

32. The baking oven according to claim 1, wherein said single elongated inductor is provided with a broad transverse extension extending transversely to said circulation path and is also provided with a long longitudinal extension extending along the course of said circulation path over a circulation path section containing said at least two successive susceptor plates.

33. The baking oven according to claim 32, wherein said single elongated inductor includes two or more inductor bars, said inductor bars extend parallel to one another along said circulation path.

34. The baking oven according to claim 33, wherein said inductor bars are individual inductor bars and each said individual inductor bar defines a respective individual inductor loop.

35. The baking oven according to claim 33, wherein said elongated inductor bars are fixed on a framework of the baking oven, said elongated inductor bars are mounted on said framework in electrically insulated manner.

36. The baking oven according to claim 32, wherein said single elongated inductor includes two or more individual inductors, said two or more individual inductors are arranged side by side and each one of said two or more individual inductors defines an individual inductor loop.

37. The baking oven according to claim 36, wherein each one of said two or more individual inductors is a U-shaped inductor having two inductor bars disposed along the course of said circulation path parallel to one another.

38. The baking oven according to claim 36, wherein each one of said two or more individual inductors includes inductor bars arranged along the course of said circulation path parallel to one another, said inductor bars are connected at their ends by a transverse bar to define an elongated coil in a longitudinal direction of said two or more individual inductors.

39. The baking oven according to claim 32, wherein said single elongated inductor defines an individual inductor loop and said single elongated inductor includes inductor bars arranged along the course of said circulation path parallel to one another, said inductor bars are connected at their ends by a transverse bar to define an elongated coil in a longitudinal direction of said individual inductor.

40. The baking oven according to claims 32, wherein said single elongated inductor defines an individual inductor loop having two half-loops disposed side by side, within said single elongated inductor two half-inductors are arranged side by side, each half-inductor is provided with inductor bars arranged along the course of said circulation path parallel to one another, said inductor bars are connected at their ends by a transverse bar to define an elongated coil in a longitudinal direction of said half-inductor.

41. The baking oven according to claim 40, wherein said inductor bars and said transverse bar of one of said half inductors are connected to define a coil in a clockwise direction and said inductor bars and said transverse bar of the other of said half inductors are connected to define a coil in a counterclockwise direction.

42. The baking oven according to claim 40, wherein said two half-inductors are provided with inductor bars and transverse bars connected to define a coil in the same direction.

43. The baking oven according to claim 32, wherein said single elongated inductor defines an individual inductor loop, said single elongated inductor is provided with inductor bars arranged along the course of said circulation path parallel to each other, said inductor bars are connected to one another alternately at their ends by a transverse bar, said inductor bars and said transverse bars are arranged in a pattern of meander having loops arranged one after another in a direction transverse to said circulation path.

44. The baking oven according to claim 43, wherein said inductor bars are solid bars having a low rectangular cross section and having a broad side facing said circulation path and said baking plates.

45. The baking oven according to claim 32, wherein said single elongated inductor is fixed on a framework of the baking oven, said single elongated inductor is mounted on said framework in electrically insulated manner.

46. The baking oven according to claim 1, wherein said single elongated inductor is disposed horizontally in the baking oven, said single elongated inductor is mounted to be vertically adjustable on a framework of the baking oven.

47. The baking oven according to claim 1, wherein said single elongated inductor is disposed at a distance to said circulation path which is smaller than the range of the magnetic field generated by said single elongated inductor.

* * * * *